United States Patent
Ikawa et al.

(10) Patent No.: US 10,414,299 B2
(45) Date of Patent: Sep. 17, 2019

(54) VEHICLE SEAT

(71) Applicant: TS TECH CO., LTD., Asaka-shi, Saitama (JP)

(72) Inventors: Haruki Ikawa, Tochigi (JP); Takeshi Akutsu, Tochigi (JP); Hirohisa Abe, Tochigi (JP); Muneyuki Nogami, Tochigi (JP)

(73) Assignee: TS Tech Co., Ltd., Saitama (JP)

( * ) Notice: Subject to any disclaimer, the term of this patent is extended or adjusted under 35 U.S.C. 154(b) by 0 days.

(21) Appl. No.: 16/166,406

(22) Filed: Oct. 22, 2018

(65) Prior Publication Data

US 2019/0054845 A1 Feb. 21, 2019

Related U.S. Application Data

(63) Continuation of application No. 15/518,969, filed as application No. PCT/JP2015/079353 on Oct. 16, 2015, now Pat. No. 10,106,060.

(30) Foreign Application Priority Data

Oct. 17, 2014 (JP) ................................. 2014-212991
Oct. 17, 2014 (JP) ................................. 2014-212992

(51) Int. Cl.
  *B60N 2/30* (2006.01)
(52) U.S. Cl.
  CPC ........... *B60N 2/3065* (2013.01); *B60N 2/309* (2013.01); *B60N 2/3011* (2013.01); *B60N 2/3072* (2013.01)
(58) Field of Classification Search
  CPC .... B60N 2/3065; B60N 2/3009; B60N 2/682; B60N 2/36

USPC ....................................................... 296/65.09
See application file for complete search history.

(56) References Cited

U.S. PATENT DOCUMENTS

| 4,522,445 | A | | 6/1985 | Goldner et al. | |
| 5,593,208 | A | * | 1/1997 | Mitschelen | B60N 2/01583 |
| | | | | | 296/65.03 |
| 8,052,194 | B2 | * | 11/2011 | Sayama | B60N 2/01583 |
| | | | | | 296/65.09 |
| 8,297,678 | B2 | * | 10/2012 | Nakao | B60N 2/01583 |
| | | | | | 296/65.09 |

(Continued)

FOREIGN PATENT DOCUMENTS

| EP | 3 072 732 A1 | 9/2016 |
| JP | 08-197994 A | 8/1996 |

(Continued)

*Primary Examiner* — Pinel E Romain
(74) *Attorney, Agent, or Firm* — Drinker Biddle & Reath LLP

(57) ABSTRACT

In a vehicle seat foldable by rotation of rotary links disposed below a seat cushion in a direction toward the seat cushion, a front end portion of the seat cushion includes a suspending portion of a cushion pad and a skin material covering the suspending portion. Contact portions of the front end portion of the seat cushion contacting the rotary links when the vehicle seat is in a folded state include a recessed portion provided at the suspending portion, and a flexible plate provided at an outer skin material downwardly extending along a front surface of the suspending portion in the skin material covering the recessed portion. The flexible plate is configured to restore the shape of the outer skin material when the rotary links are separated from the contact portions.

7 Claims, 16 Drawing Sheets

(56) References Cited

U.S. PATENT DOCUMENTS

| | | | |
|---|---|---|---|
| 8,474,910 B2 * | 7/2013 | Kammerer | B60N 2/12 296/65.09 |
| 9,649,957 B2 | 5/2017 | Seibold et al. | |
| 2007/0102983 A1 | 5/2007 | Sturt | |
| 2009/0243323 A1 | 10/2009 | Mitsuhashi | |
| 2010/0320824 A1 | 12/2010 | Aoki et al. | |
| 2012/0248839 A1 | 10/2012 | Fujita et al. | |
| 2015/0329019 A1 | 11/2015 | Abe et al. | |
| 2015/0360596 A1 | 12/2015 | Eisenbraun | |

FOREIGN PATENT DOCUMENTS

| | | |
|---|---|---|
| JP | 2004-142676 A | 5/2004 |
| JP | 2007-302125 A | 11/2007 |
| JP | 2014-141240 A | 8/2014 |
| JP | 2014-172485 A | 9/2014 |

* cited by examiner

FRONT ←——————————→ BACK

VEHICLE SEAT

CROSS REFERENCE TO RELATED APPLICATIONS

This application is a continuation of U.S. patent application Ser. No. 15/518,969, filed on Apr. 13, 2017, now U.S. Pat. No. 10,106,060, which is a National Stage Entry application of PCT Application No. PCT/JP2015/079353, filed Oct. 16, 2015, which claims the priority benefit of Japanese Patent Application Nos. JP2014-212991 and JP2014-212992, both filed Oct. 17, 2014, the contents of each of which are incorporated herein by reference in their entireties.

BACKGROUND

The present disclosure relates to a vehicle seat, and particularly relates to a vehicle seat foldable by rotation of a rotary member disposed below a seat cushion in a direction toward the seat cushion.

Vehicle seats foldable in housing have been already well known. Of these foldable vehicle seats, a vehicle seat is configured to be foldable by rotation of a rotary member disposed below a seat cushion in a direction toward the seat cushion (see, e.g., Japanese Patent Publication JP 2007-302125A and Japanese Patent Publication JP 2014-172485A).

JP 2007-302125A describes a vehicle seat including, below a seat cushion, a front housing link as a rotary member. The vehicle seat described in JP 2007-302125A is now described. One end portion of the front housing link in a longitudinal direction thereof is rotatably supported, and the other end portion of the front housing link in the longitudinal direction thereof is rotatably supported on the seat cushion. The vehicle seat configured as described in JP 2007-302125A is folded by rotation of the front housing link in a direction toward the seat cushion. In a folded state of the vehicle seat, the seat cushion stacks on the front housing link, and a portion of the front housing link contacts an edge portion of a bottom portion of the seat cushion.

In the configuration in which the portion of the link contacts the edge portion of the seat cushion when the vehicle seat is folded, when reactive force (force acting on the link when the link contacts the edge portion) acting on the link from the edge portion increases, it becomes difficult to smoothly fold the vehicle seat. The edge portion of the seat cushion provides an influence on the outer appearance of the seat. For this reason, a configuration with an excellent design has been demanded as the configuration of the edge portion of the seat cushion. Moreover, even when the edge portion of the seat cushion is partially compressed due to contact with the link, such a compressed portion needs to be restored from a compressed state to an original state when the link is separated.

Moreover, a vehicle rear seat described in JP 2014-172485A includes a rotary link and a piston damper, an upper end of the rotary link being attached to a seat cushion side and a lower end of the rotary link being rotatably coupled to a vehicle floor side. It is configured such that in the operation of housing a seat body, the rotary link rotates toward a seat back side after a seat back has been folded to the seat cushion side, and in this manner, the seat body can be housed in a recessed housing portion. Moreover, the piston damper is configured such that biasing force is constantly applied to the seat cushion side. The piston damper supports a seat cushion from below, and assists the seat housing operation.

In the above-described link structure disclosed in JP 2014-172485A, the force of upwardly supporting the seat cushion from below by the piston damper is helpful in a seatable state, but decreases as the seat cushion rotates to a housed state. Specifically, in the seatable state in which the piston damper extends substantially in the vertical direction, an upward force component is great, and therefore, the supporting force is great. However, the piston damper inclines to the substantially horizontal direction while rotating to the housed state, and the upward force component decreases. Accordingly, the supporting force decreases.

According to the above-described configuration, when the seat cushion rotates from the seatable state to the housed state, the speed of rotation might increase, leading to great noise due to contact with a vehicle floor. In this case, while the seat cushion is rotating, if a user's hand supports the seat cushion not to increase the speed of rotation of the seat cushion, it is difficult to smoothly rotate the seat cushion. This leads to an unfavorable feeling of operation.

When the seat cushion is lifted such that the seat cushion rotates from the housed state to the seatable state, the supporting force of the piston damper is small as described above, and for this reason, sufficient rotation support cannot be provided. When the seat cushion rotates from the housed state to the seatable state, if the supporting force of the piston damper is set higher to provide the sufficient support, the seat cushion might unexpectedly rotate (lift) from the housed state due to oscillation in vehicle operation, for example.

SUMMARY

The present disclosure has been made in view of the above-described problems, and various embodiments provide a vehicle seat capable of being smoothly folded and ensuring the design of an edge portion of a seat cushion in the configuration in which a rotary member contacts the edge portion in folding of the seat. Moreover, various embodiments of the present disclosure provide a vehicle seat capable of smoothly rotating a seat cushion between predetermined positions. Further, embodiments of the present disclosure prevent unexpected rotation of a seat cushion.

According to the present disclosure, at least some of the above-described problems are solved by various embodiments of a vehicle seat having a seat cushion and a rotary member disposed below the seat cushion, wherein the vehicle seat is configured to be foldable by rotation of the rotary member in a direction toward the seat cushion. An edge portion of the seat cushion includes a cushion material that protrudes downward and a skin material that covers the cushion material. A contact portion of the edge portion contacting the rotary member when the vehicle seat is in a folded state includes a recessed portion provided at the cushion material and having a smaller amount of downward protrusion of the cushion material than that in a portion of the edge portion other than the contact portion, and a shape restoration member provided at a downwardly-extending outer edge portion of the skin material covering the recessed portion and configured to restore the shape of the outer edge portion when the rotary member is separated from the contact portion.

In the above-described configuration, the recessed portion having a smaller amount of downward protrusion of the cushion material than that in the portion other than the contact portion is formed at the contact portion of the edge portion of the seat cushion contacting the rotary member. With the recessed portion, reactive force acting on the rotary member from the above-described contact portion upon contact with the rotary member becomes smaller, and therefore, the vehicle seat can be smoothly folded. Moreover, in the above-described configuration, the shape restoration member is provided at the downwardly-extending outer edge portion of the skin material covering the recessed portion, and the shape restoration member restores the shape of the outer edge portion when the rotary member is separated from the contact portion. With this configuration, even when an easily-visible outer edge portion of the contact portion is compressed by the rotary member, the above-described outer edge portion is restored to an original shape after the rotary member has been separated from the contact portion. As described above, according to the vehicle seat of the present disclosure, folding can be smoothly performed even in the configuration in which the rotary member contacts the edge portion of the seat cushion in folding of the seat, and the design of the edge portion (specifically, the outer edge portion) can be ensured.

Moreover, in an embodiment of the above-described vehicle seat, the recessed portion is preferably formed in such a manner that a lower end portion of the cushion material provided at the edge portion is cut out, and the shape restoration member preferably includes a flexible plate disposed at a lower end portion of the outer edge portion. According to the above-described configuration, the flexible plate as the shape restoration member is disposed at the lower end portion of the outer edge portion. With this configuration, when the rotary member is separated from the contact portion, the shape of the outer edge portion can be easily restored.

Further, in an embodiment of the above-described vehicle seat, the shape restoration member more preferably includes a flexible plate extending along a width direction of the vehicle seat, and the recessed portion is more preferably provided between both ends of the flexible plate in the width direction. In the above-described configuration, the flexible plate extends over the recessed portion in the width direction. With this configuration, when the rotary member is separated from the contact portion, the shape of the outer edge portion can be effectively restored.

In addition, in an embodiment of the above-described vehicle seat, the rotary member is a first rotary member and a second rotary member, configured to rotate together with the first rotary member when the vehicle seat is folded, is preferably disposed at a position of a front portion of the seat cushion that is lower than the first rotary member. A front end portion of the edge portion positioned in the front of the second rotary member much more preferably includes a holding portion provided at the cushion material to hold the shape of the outer edge portion of the skin material covering the front end portion. The amount of downward protrusion of the cushion material is much more preferably greater in the holding portion than in the recessed portion. The recessed portion much more preferably includes recessed portions provided at positions that sandwich the second rotary member in the width direction of the vehicle seat, and the holding portion is much more preferably provided between the recessed portions. In the above-described configuration, the holding portion formed at the cushion material to hold the shape of the outer edge portion is disposed at the front end portion of the edge portion of the seat cushion in the front of the another rotary member. The front end portion has at least two recessed portions positioned to sandwich the second rotary member, and the above-described holding portion is provided between the recessed portions. With the holding portion provided between the recessed portions, the shape of the skin material (specifically, the shape of the outer edge portion) at the front end portion of the seat cushion can be more favorably held as compared to the configuration in which the recessed portions are continuously provided.

Moreover, in an embodiment of the above-described vehicle seat, the contact portion much more preferably includes a plurality of contact portions provided at different points of the edge portion. Each of the plurality of contact portions much more preferably includes the shape restoration member as a flexible plate. The width of the shape restoration member of one of the plurality of contact portions is much more preferably smaller than that of other contact portions of the plurality of contact portions. In the above-described configuration, the width of the shape restoration member varies according to the position of the contact portion. That is, in the above-described configuration, the shape restoration member with a suitable size is disposed considering a difference in the position of the contact portion. As a result, the design of the edge portion of the seat cushion (specifically, the design of the outer edge portion) can be more accurately ensured.

Further, in an embodiment of the above-described vehicle seat, one of the other contact portions more preferably contacts a first link as the rotary member on one end side of the seat cushion in the width direction of the vehicle seat. The one of the plurality of contact portions more preferably contacts a second link and a third link as the rotary member on the other end side of the seat cushion in the width direction. Each of the first link, the second link, and the third link is more preferably rotatably supported by a rotary shaft along the width direction. Both of the second link and the third link are more preferably adjacent to each other in the width direction. When the vehicle seat is in the folded state, one of the rotary shafts of the second link and the third link is more preferably positioned closer to the seat cushion than the other rotary shaft. In the above-described configuration, multiple links (the second link and the third link) contact the one of the plurality of contact portions of the edge portion of the seat cushion. Moreover, the positions of the rotary shafts of the plurality of links are different from each other, and the rotary shaft of one of the links is closer to the seat cushion than the rotary shaft of the other link when the vehicle seat is in the folded state. With such a configuration, the amount of compression upon contact with the link is greater in the one of the contact portions than in the other contact portion contacting the first link. Moreover, the width of the shape restoration member of the one of the contact portion is smaller than that of the other contact portion. That is, in the above-described configuration, the width of the shape restoration member is smaller in one of the plurality of contact portions with a greater amount of compression upon contact with the link. With this configuration, the contact portion with a greater amount of compression upon contact with the link is more easily deformable upon contact with the link, and as a result, the seat can be more smoothly folded.

In addition, at least some of the above-described problems are solved by various embodiments of the above-described vehicle seat further including the seat cushion and a seat movement mechanism configured to reciprocate the seat cushion between a first position and a second position different from each other in a predetermined direction. The seat movement mechanism includes two links as the rotary member configured to rotate relative to a vehicle floor and rotate relative to the seat cushion when the seat cushion moves between the first position and the second position, and a biasing member configured to provide, to the seat cushion, biasing force in a direction from one end fixed to the vehicle floor toward the other end attached to the seat cushion. A virtual plane passing through a center line of a first rotary shaft configured to rotatably support one of the two links and a center line of a first coupling shaft provided to couple the one of the two links to the seat cushion is a first plane. A virtual plane passing through a center line of a second rotary shaft configured to rotatably support the other link and a center line of a second coupling shaft provided to couple the other link to the seat cushion is a second plane. In a zone in which the seat movement mechanism moves the seat cushion between the first position and the second position, both of the two links rotating relative to the vehicle floor rotate relative to the seat cushion, and in this manner, the intersection line between the first plane and the second plane is, while both of the two links incline to be closer to the second position than to the first position in the zone, positioned above the seat cushion and the biasing member biases the seat cushion toward the first position. In the above-described configuration, the intersection line between the first plane and the second plane is, in the seat cushion movement zone, positioned above the seat cushion, and the biasing member biases the seat cushion in the direction in which the biasing member extends on a first position side of the intersection line. Thus, the biasing force toward the first position side can be generated by the seat movement mechanism when the seat cushion moves. This can prevent rapid movement of the seat cushion from the first position to the second position, and can support movement of the seat cushion when the seat cushion moves from the second position to the first position. Thus, the seat cushion can smoothly move.

Moreover, in an embodiment of the above-described vehicle seat, when the seat cushion is located at the first position, the intersection line may be positioned below the seat cushion and the biasing member biases the seat cushion toward the second position. According to the above-described configuration, the intersection line is positioned below the seat cushion, and is on the second position side with respect to the biasing direction of the biasing member. Thus, a moment generated about the intersection line toward the second position by the biasing member is applied to the seat cushion, and therefore, the seat cushion can easily move to the second position.

Further, in an embodiment of the above-described vehicle seat, a reactive force generated by the biasing member about the intersection line positioned above the seat cushion is preferably smaller than a force component of force generated by the weight of the seat cushion itself, the force component being parallel to the reactive force. According to the above-described configuration, when the seat cushion moves to the second position, the seat cushion can decelerate by the reactive force of the biasing member, and the seat cushion can smoothly rotate by the weight of the seat cushion itself.

In addition, when the seat cushion is located at the second position in the above-described vehicle seat, the intersection line and the first coupling shaft are preferably positioned on opposite sides of the first rotary shaft, and the biasing member preferably biases the seat cushion in the direction from the first position to the second position. According to the above-described configuration, the seat cushion located at the second position is biased by the biasing member in the direction in which the biasing member extends at the position farther from the first position than the intersection line, and therefore, a moment toward the second position is generated on the seat cushion. This prevents unexpected movement of the seat cushion from the second position to the first position.

Moreover, in an embodiment of the above-described vehicle seat, the vehicle seat is preferably provided with a holding member fixed to a vehicle body and configured to hold the state of the seat cushion located at the second position. According to the above-described configuration, the seat cushion can be held in the state at the second position even in the case of receiving a greater load than usual, such as the case of upper-to-lower movement during vehicle traveling.

In an embodiment of the above-described vehicle seat, the holding member may be a strap connecting between the vehicle seat and the vehicle body. According to the above-described configuration, the strap can easily prevent lifting of the seat cushion.

Moreover, in an embodiment of the above-described vehicle seat, the holding member may be a lock device configured to lock the vehicle seat and the vehicle body together. According to the above-described configuration, the lock device can reliably prevent lifting of the seat cushion.

According to an embodiment of the vehicle seat of the present disclosure, folding can be smoothly performed even in the configuration in which the rotary member contacts the edge portion of the seat cushion in folding of the seat, and the design of the edge portion can be ensured. Moreover, according to an embodiment of the vehicle seat of the present disclosure, the flexible plate as the shape restoration member is disposed at the lower end portion of the outer edge portion. Thus, when the rotary member is separated from the contact portion, the shape of the outer edge portion can be easily restored. Further, according to an embodiment of the vehicle seat of the present disclosure, the influence of contact with the rotary member on the outer edge portion of the skin material, e.g., occurrence of wrinkles of an outer skin material, can be reduced, and the design of the outer edge portion can be improved. In addition, according to an embodiment of the vehicle seat of the present disclosure, the flexible plate extends over the recessed portion in the width direction. Thus, when the rotary member is separated from the contact portion, the shape of the outer edge portion can be effectively restored. Moreover, according to an embodiment of the vehicle seat of the present disclosure, the front end portion of the edge portion of the seat cushion positioned in the front of the second rotary member has at least two recessed portions positioned to sandwich the second rotary member, and the holding portion is provided between the recessed portions. Thus, the shape of the skin material at the front end portion can be favorably held. Further, according to an embodiment of the vehicle seat of the present disclosure, the shape restoration member with the suitable size is disposed considering the difference in the position of the contact portion at the edge portion of the seat cushion. Thus, the design of the edge portion of the seat cushion can be more accurately ensured. In addition, according to an embodiment of the vehicle seat of the present disclosure, the contact portion with a greater amount of compression upon contact with the link is more easily deformable upon contact with the link, the contact portion being included in the plurality of contact portions provided at the edge portion of the seat cushion. Accordingly, the seat can be more smoothly folded. Moreover, according to an embodiment of the vehicle seat of the present disclosure, rapid movement of the seat cushion from the first position to the second position can be prevented, and movement of the seat cushion can be supported when the seat cushion moves from the second position to the first position. Thus, the seat cushion can smoothly move. Further, according to an embodiment of the vehicle seat of the present disclosure, the moment generated about the intersection line toward the second position by the biasing member is applied to the seat cushion, and therefore, the seat cushion can easily move to the second position. In addition, according to an embodiment of the vehicle seat of the present disclosure, when the seat cushion moves to the second position, the seat cushion can decelerate by the reactive force of the biasing member, and the seat cushion can smoothly rotate by the weight of the seat cushion itself. Moreover, according to an embodiment of the vehicle seat of the present disclosure, unexpected movement of the seat cushion from the second position to the first position can be prevented. Further, according to an embodiment of the vehicle seat of the present disclosure, the seat cushion can be held in the state at the second position. In addition, according to an embodiment of the vehicle seat of the present disclosure, lifting of the seat cushion can be easily prevented. Moreover, according to an embodiment of the vehicle seat of the present disclosure, lifting of the seat cushion can be reliably prevented.

BRIEF DESCRIPTION OF DRAWINGS

Various embodiments of the invention are illustrated in the drawings, in which.

DETAILED DESCRIPTION

Outline Configuration of Vehicle Seat of Embodiment of the Present Disclosure

An embodiment (hereinafter referred to as a "present embodiment") of the present disclosure is described below with reference to drawings. Note that in description below, a front-to-back direction means a front-to-back direction of a vehicle, and corresponds to a front-to-back direction of a vehicle seat. Moreover, a side on which a passenger is seated on a seat back of the vehicle seat is a seat front side, and a right-to-left direction is defined with respect to the front side. Further, a width direction means the right-to-left direction (a horizontal width direction) of the vehicle, and corresponds to a width direction of the vehicle seat. In addition, in description below, an inner side (hereinafter also simply referred to as an "inner side") in the width direction means one end side in the width direction, specifically a side close to the center of the vehicle in the width direction. Similarly, an outer side (hereinafter also simply referred to as an "outer side") in the width direction means the other end side in the width direction, specifically a side apart from the center of the vehicle in the width direction. Unless otherwise provided, the position, posture, etc. of each member described below indicate a position, a posture, etc. in a use state of the vehicle seat, i.e., a seatable state of the vehicle seat.

Figure 1A:
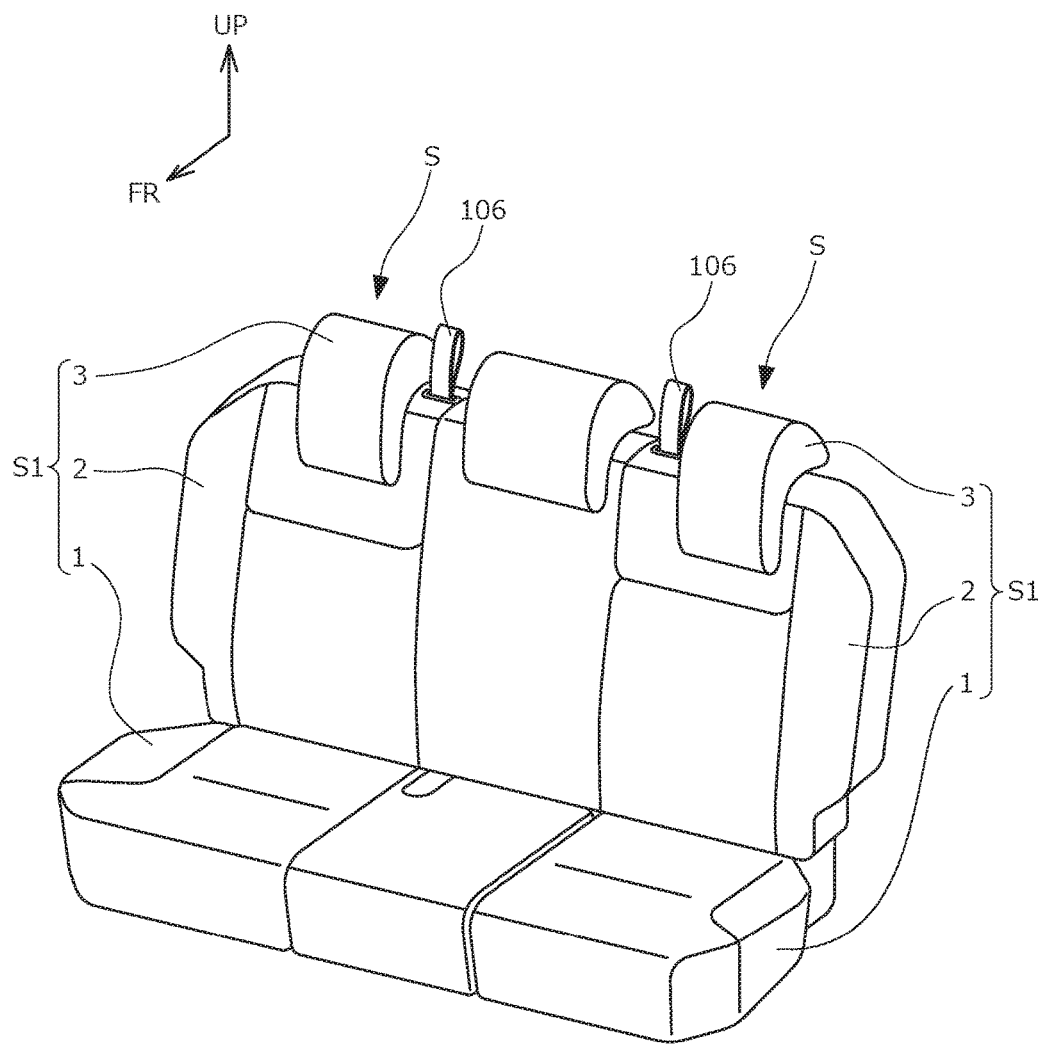
FIG. 1A is a schematic perspective view of a vehicle seat of the present disclosure.
Figure 1B:
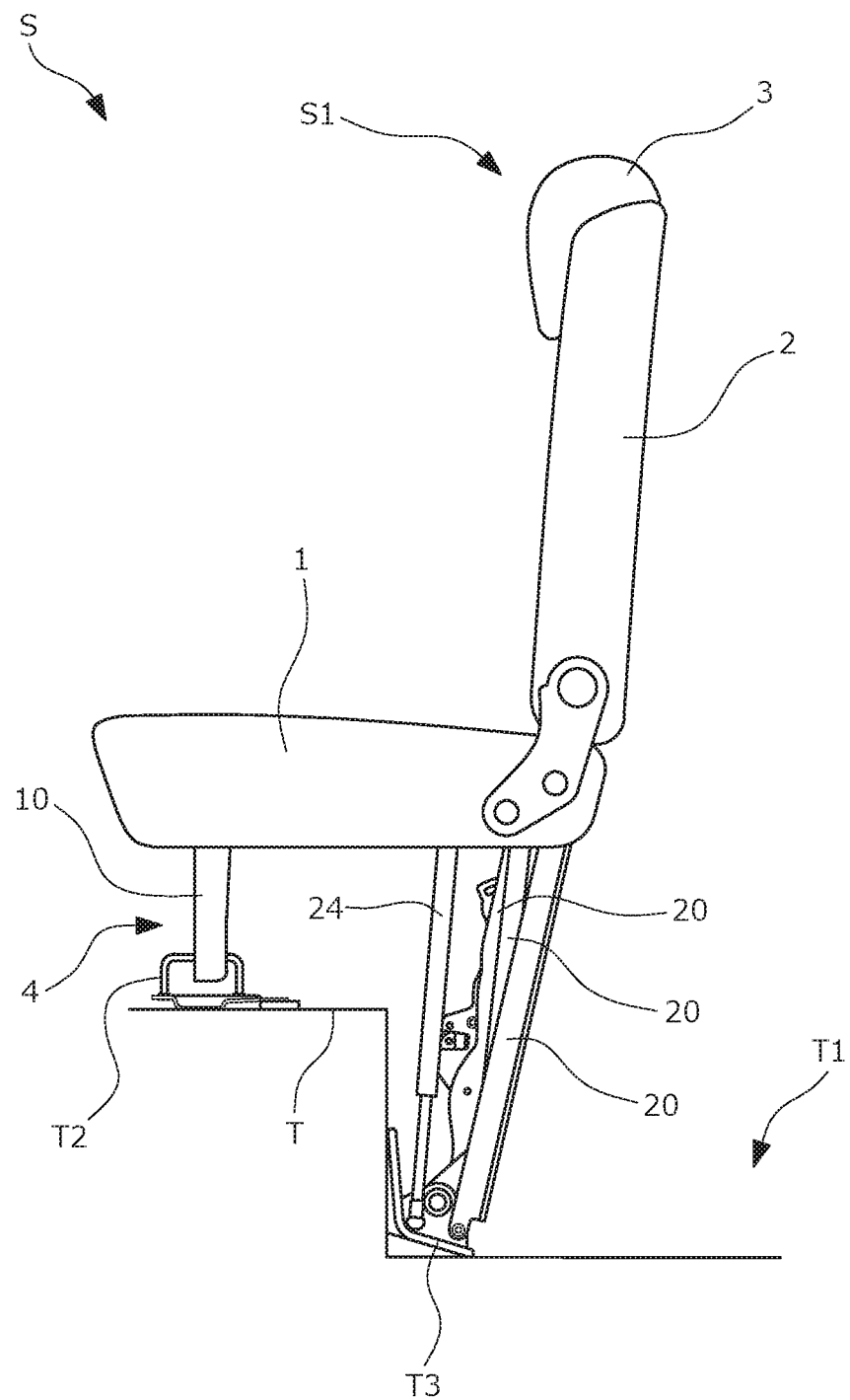
FIG. 1B is a side view of a vehicle seat of an embodiment of the present disclosure.

The vehicle seat (hereinafter referred to as a "present seat S") of the present embodiment forms a back seat of the vehicle. As illustrated in FIGS. 1A and 1B, the present seat S includes a seat body S1 as a main portion of the seat. Note that FIG. 1B is a side view of the present seat S in the seatable state.

Figure 3:
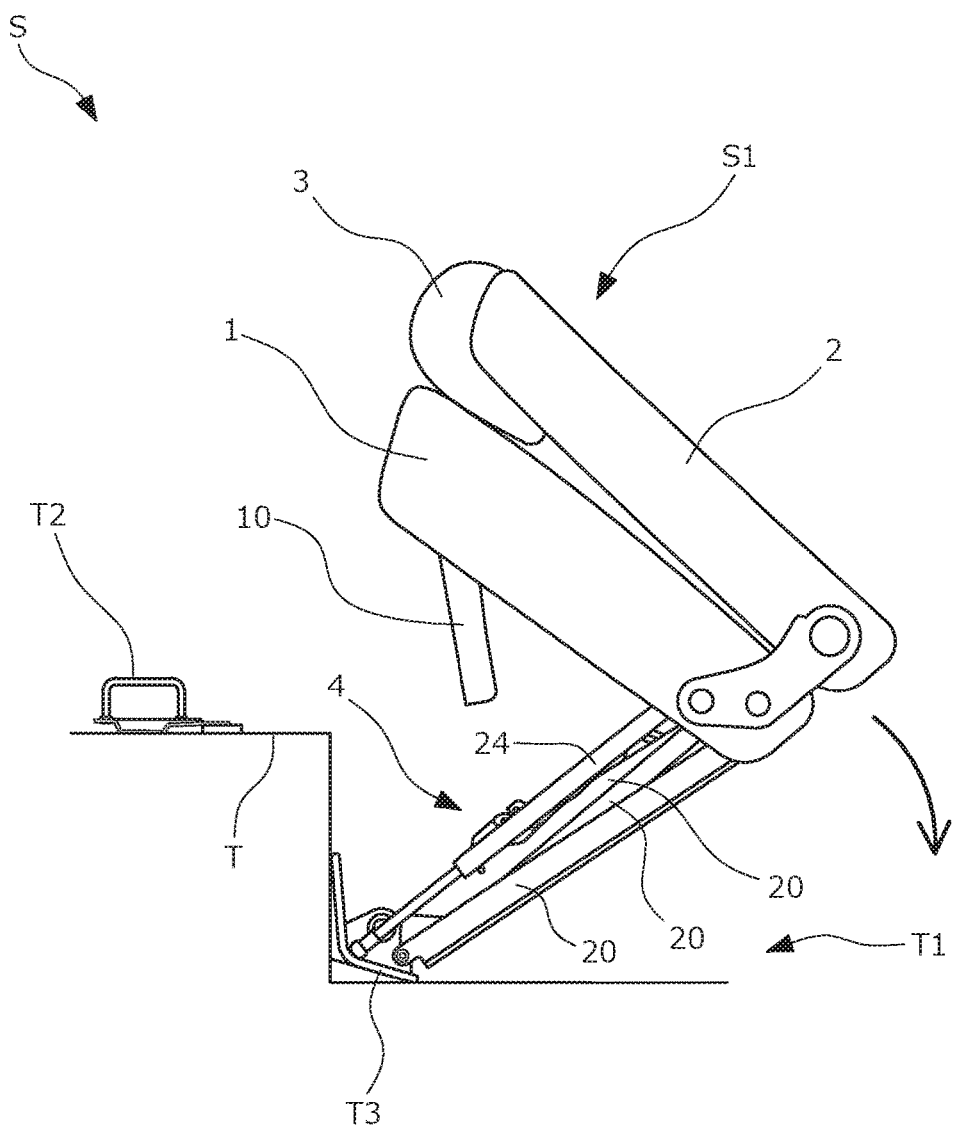
FIG. 3 is a side view of a second step of housing the vehicle seat of the embodiment of the present disclosure.

The seat body S1 includes a seat cushion 1, a seat back 2, and a head rest 3. As illustrated in FIG. 1A, the seat back 2 is a backrest configured to support the back of the passenger from behind, and includes a seat back frame (not shown) as a framework, and a cushion pad (not shown). The seat back frame 2a includes a substantially rectangular frame body as the framework of the seat back 2. As illustrated in FIG. 3, a lower end portion of the seat back frame 2a is coupled to a seat cushion 1.

Figure 5:
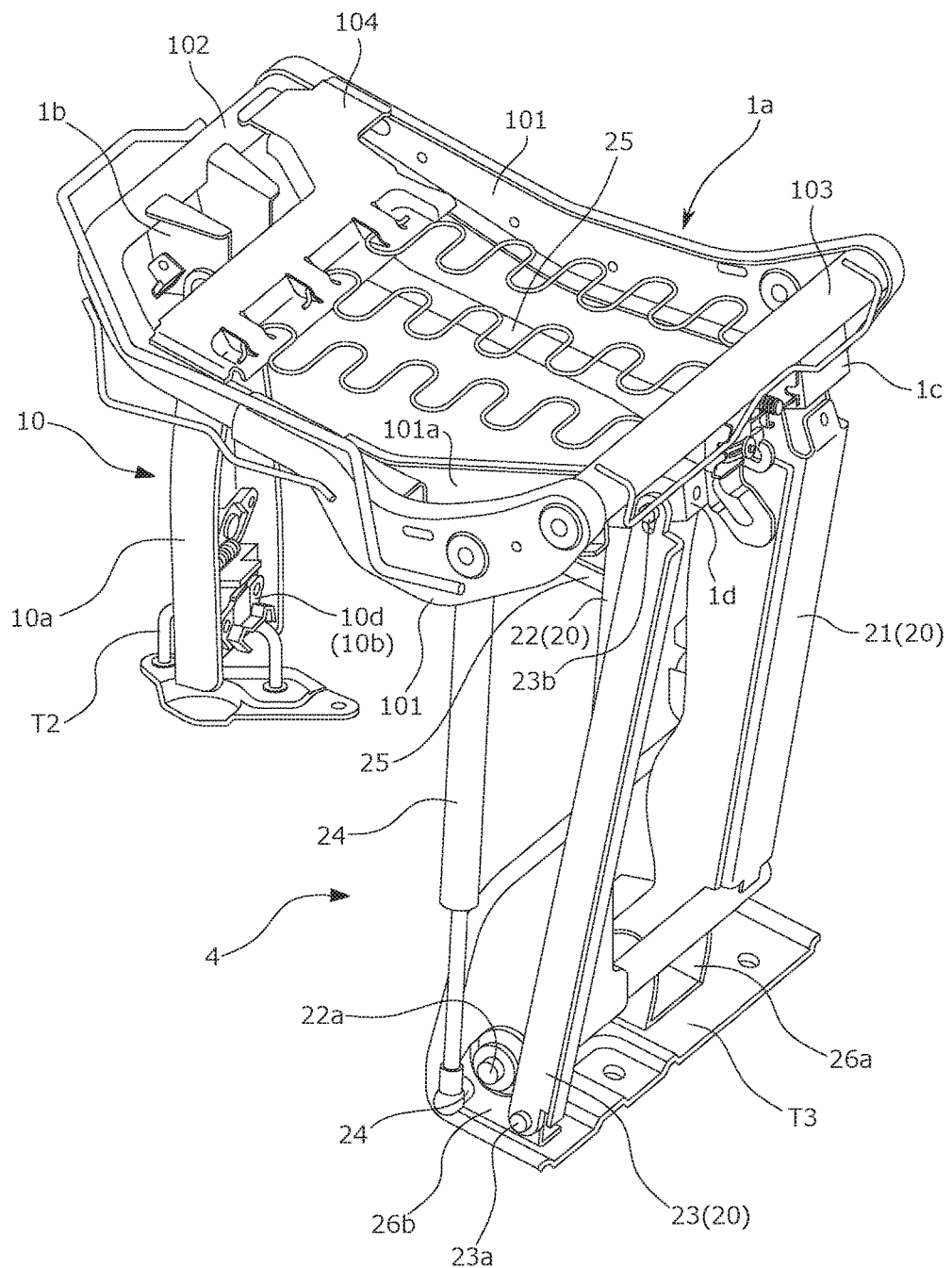
FIG. 5 is a perspective view of a seat housing mechanism provided at the vehicle seat of the embodiment of the present disclosure.

The seat cushion 1 is a seating portion configured to support the passenger from below, and includes the seat cushion frame 1a as a framework illustrated in FIG. 5, and a cushion pad (not shown). The seat cushion frame 1a includes a substantially rectangular frame body as the framework of the seat cushion 1. As illustrated in FIG. 5, the seat cushion frame 1a includes, as main components, side frames 101 arranged respectively on the right and left sides, a front coupling pipe 102 coupling front portions of the side frames 101 together, a back coupling pipe 103 coupling back portions of the side frames together, and a pan frame 104 as a plate-shaped frame bridged over an upper surface of the front coupling pipe 102.

The side frames 101 each include a sheet metal member extending in the front-to-back direction. The side frames 101 are coupled together to sandwich the front coupling pipe 102 and the back coupling pipe 103, leading to a higher coupling rigidity. A reinforcement side frame 101a disposed facing the side frame 101 across the front-to-back direction is attached to the left side frame 101.

The reinforcement side frame 101a is a member configured to reinforce the side frame 101 to which a below-described piston damper 24 is attached. A front portion of the reinforcement side frame 101a is coupled to the front coupling pipe 102, and a back portion of the reinforcement side frame 101a is coupled to the back coupling pipe 103. A rotary bolt (not shown) is fastened to the reinforcement side frame 101a in the seat right-to-left direction so that an upper end portion of the piston damper 24 is rotatably coupled to the reinforcement side frame 101a.

An upper end portion of a below-described footlink 10 is rotatably attached to the front coupling pipe 102 via a fixing bracket 1b. Two right and left fixing brackets 1c, 1d each configured to rotatably couple a corresponding one of below-described rotary links 20 to a lower end portion of the back coupling pipe 103 are attached to the back coupling pipe 103. The fixing brackets 1c, 1d rotatably support upper end portions of the rotary links 20 by fastening of rotary bolts (not shown) in the seat right-to-left direction.

The head rest 3 is a head portion configured to support the head of the passenger from behind, and includes a pillar (not shown) as a core and a cushion pad (not shown).

As illustrated in FIG. 1B, a recessed housing space T1 formed on a vehicle floor T is provided behind the present seat S in a vehicle inner space. That is, a housed position is provided on the back side of the present seat S. The present seat S in a folded state can be housed in the housing space T1.

As described above, the present seat S has such a configuration that the state of the seat cushion 1 is switchable between the seatable state and a seat housed state (hereinafter also simply referred to as a "housed state"). In other words, the present seat S is a seat which can be arranged in two forms including the seatable state in which the passenger can be seated on the present seat S and the housed state in which the seat body is housed at the housed position.

More specifically speaking, in the seatable state of the present seat S, when the passenger pulls an operation strap 106 illustrated in FIG. 1A, the seat back 2 is folded while falling forward to the seat cushion 1. Subsequently, the folded seat body is rotatably flipped up toward the back of the seat, and then, moves in a sinking direction. Then, the seat body is housed at the housed position. Note that the position of the present seat S when the present seat S is in the seatable state is also referred to as a "seatable position," and the position of the present seat S when the present seat S is in the housed state is also referred to as the "housed position." The seatable position corresponds to a first position of the present disclosure, and the housed position corresponds to a second position of the present disclosure.

Figure 2:
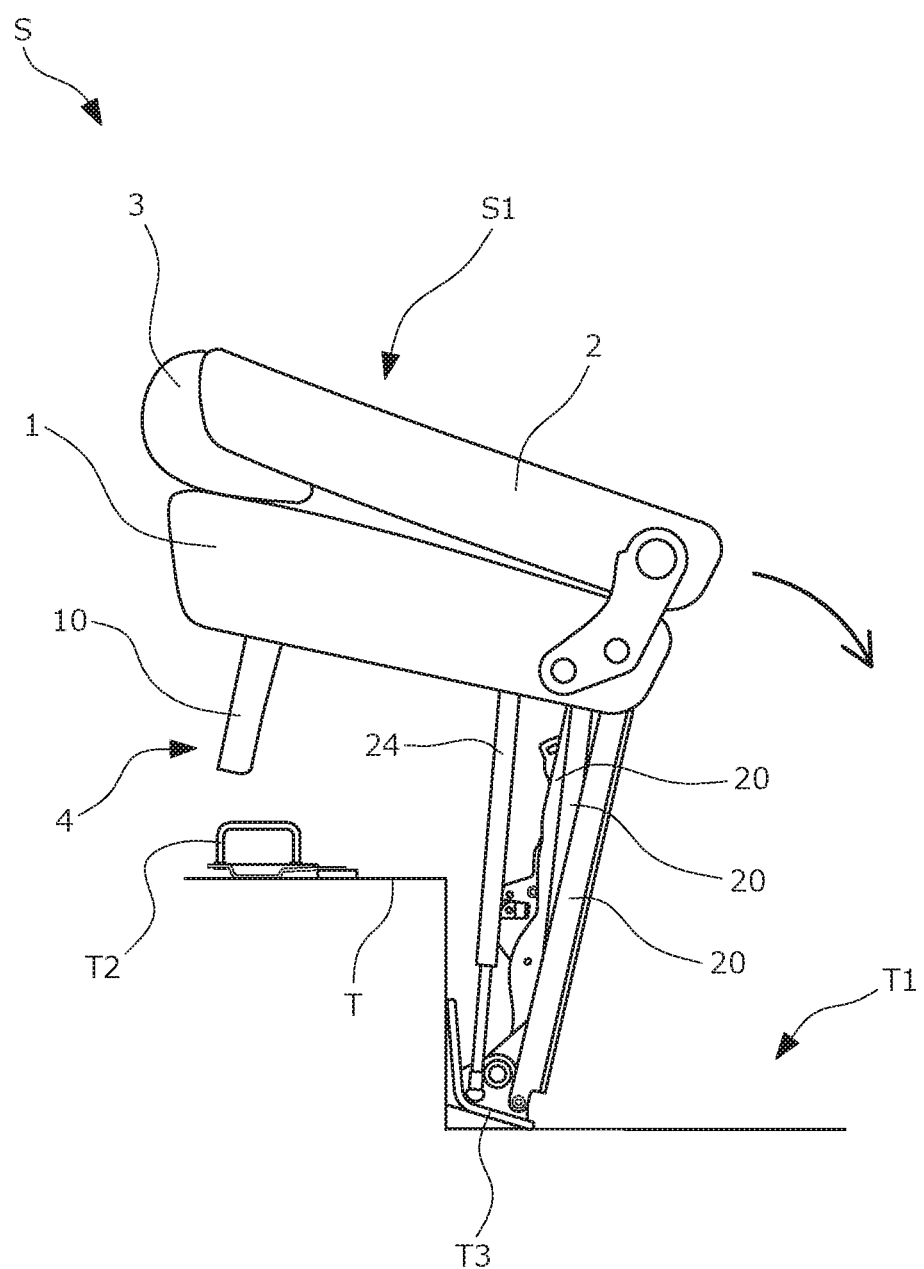
FIG. 2 is a side view of a first step of housing the vehicle seat of the embodiment of the present disclosure.
Figure 4:
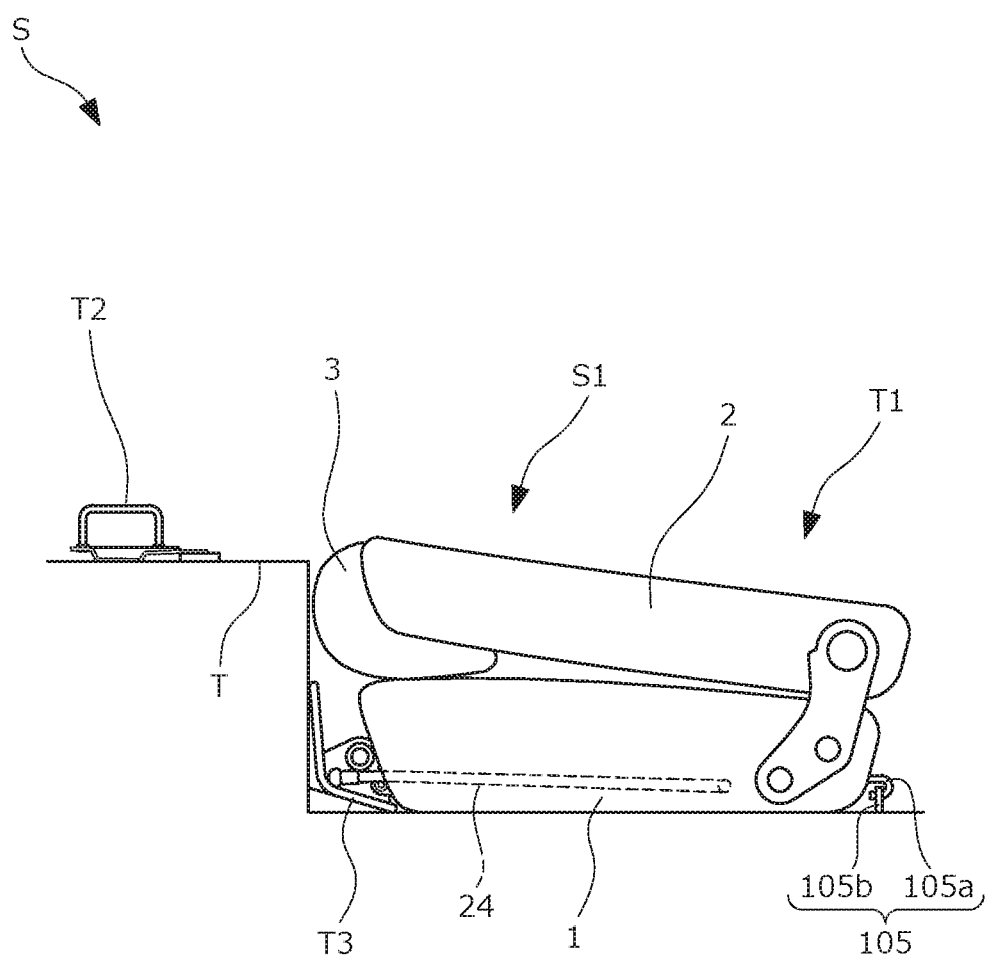
FIG. 4 is a side view of a third step of housing the vehicle seat of the embodiment of the present disclosure.

The operation of housing the present seat S is outlined below. In the seatable state (the state illustrated in FIG. 1B) of the present seat S, when the passenger pulls the operation strap 106 (FIG. 1A), the seat back 2 inclines forward to stack on the seat cushion 1 as illustrated in FIG. 2. Subsequently, the seat body S1 folded in half moves (rotates) to sink backward as illustrated in FIGS. 2 and 3 by operation of a below-described seat housing mechanism 4. Eventually, the seat body S1 folded in half and the seat housing mechanism 4, i.e., the entirety of the present seat S, are housed in the housing space T1 as illustrated in FIG. 4. FIGS. 2 to 4 are views of the steps of housing the present seat S. Note that in housing of the seat, the state of the present seat S transitions in the order of FIGS. 2, 3, 4.

Figure 6:
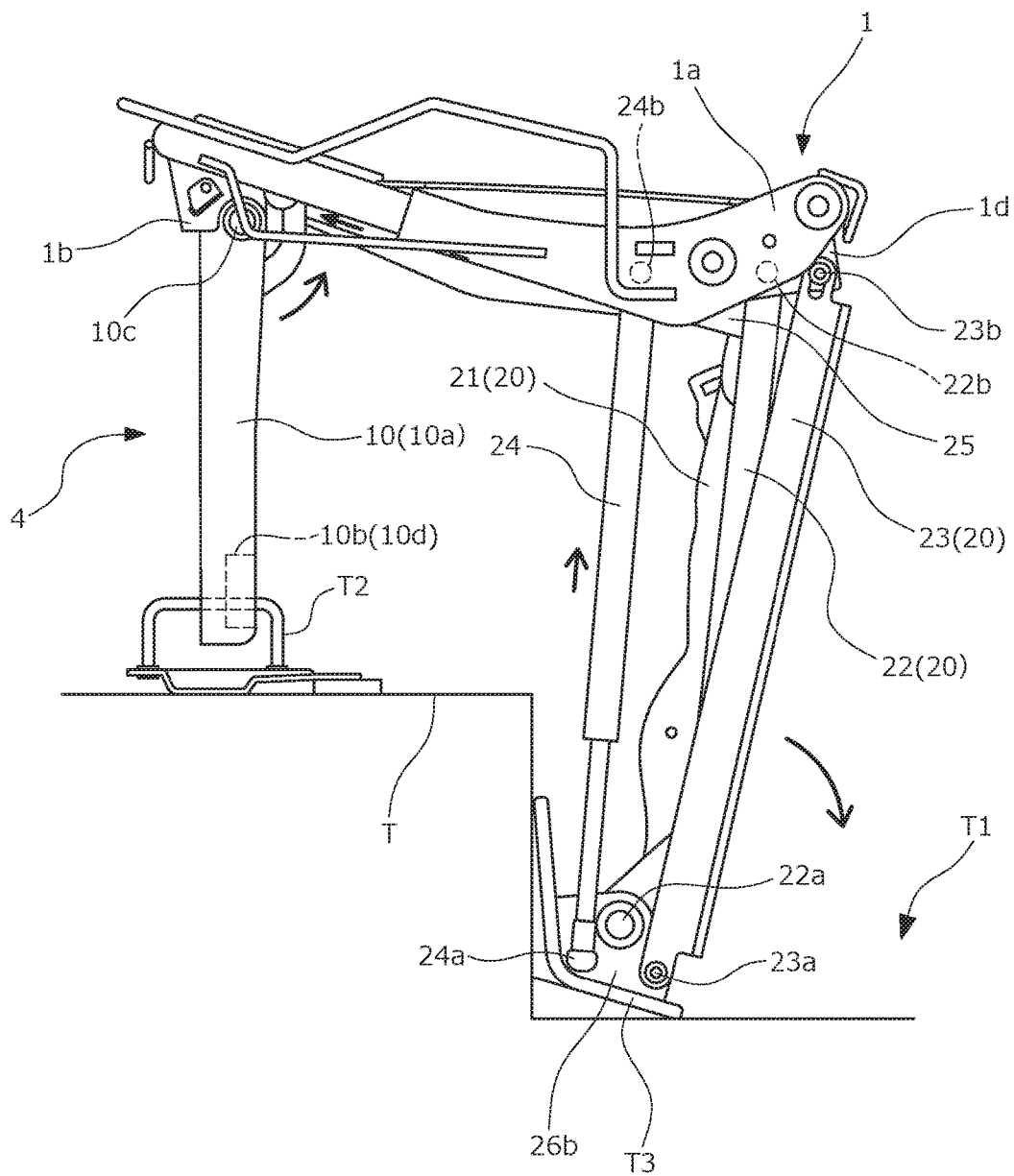
FIG. 6 is a side view of the seat housing mechanism.
Figure 7:
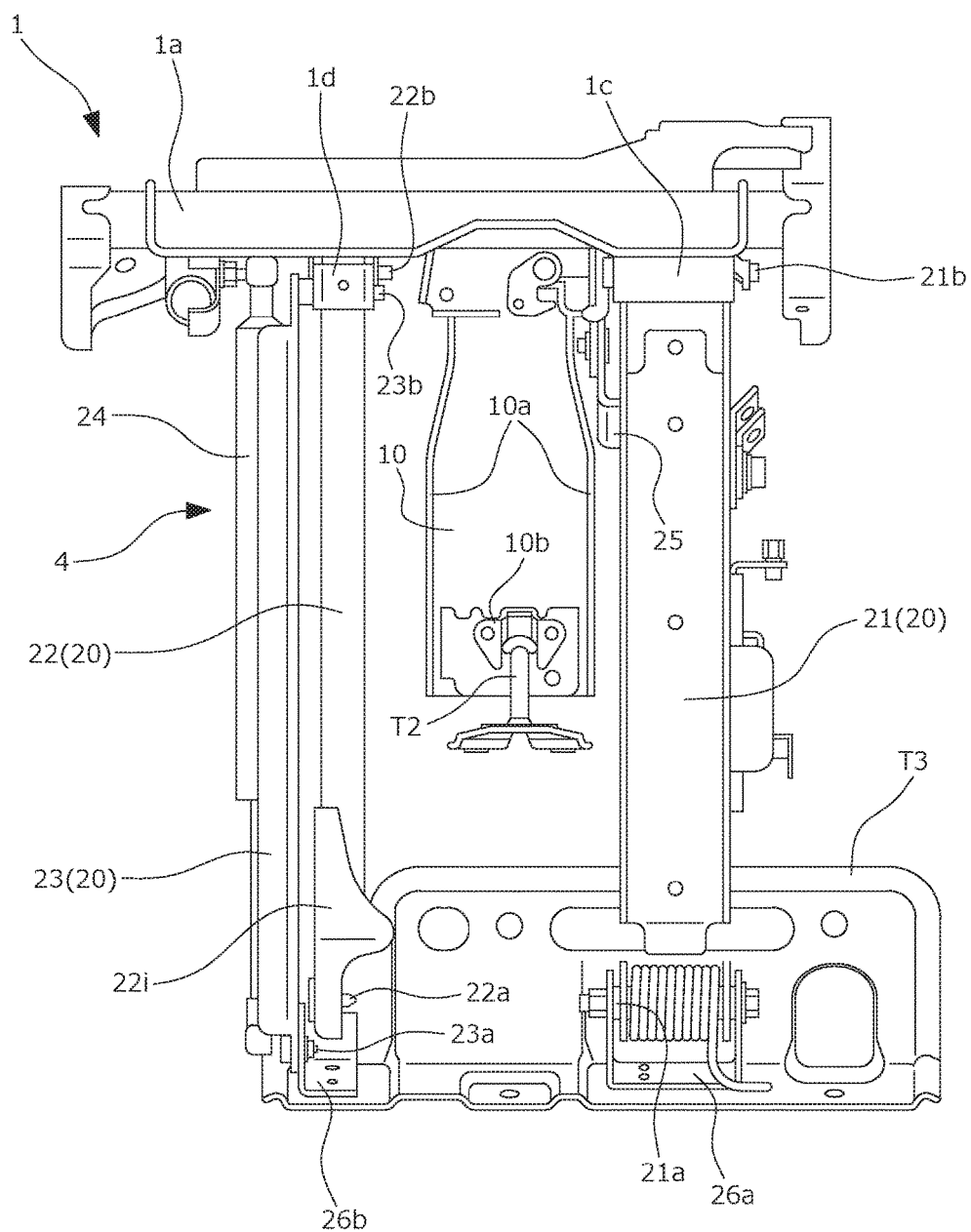
FIG. 7 is a back view of the seat housing mechanism.

Next, the configuration of the seat housing mechanism 4 is described. The seat housing mechanism 4 is a seat movement mechanism configured to guide the seat body S1 into the housing space T1. The seat housing mechanism 4 includes, as main components, the footlink 10 and the plurality of rotary links 20 illustrated in FIG. 1B and FIGS. 2 to 7. FIGS. 5 to 7 are views of the configuration of the seat housing mechanism 4. FIGS. 5, 6, 7 illustrate a perspective view, a side view, and a back view, respectively.

When the present seat S is folded, the footlink 10 and the plurality of rotary links 20 each rotate to approach the seat cushion 1. Each rotary link 20 described herein corresponds to a rotary member, and the footlink 10 described herein corresponds to another rotary member.

An upper end of the footlink 10 is attached to a lower position of a front portion of the seat cushion 1. When the present seat S is in the seatable state, the footlink 10 supports the seat body S1 including the seat cushion 1. Moreover, the footlink 10 is disposed such that a lower end thereof is detachably coupled to a vehicle floor side. Specifically speaking, the footlink 10 includes, at a lower end portion thereof, a striker lock mechanism 10b illustrated in, e.g., FIG. 7. The striker lock mechanism 10b engages with a striker T2 placed on a portion of the vehicle floor T, the portion being raised by a single step. Since the striker lock mechanism 10b engages with the striker T2, the seat body S1 is locked in the seatable state.

On the other hand, when the striker lock mechanism 10b and the striker T2 are disengaged from each other, the entirety of the present seat S is brought into a movable state, and can move toward the inside of the housing space T1. Note that the striker lock mechanism 10b and the striker T2 are disengaged from each other when an unlocking mechanism (not shown) is operated in the process of inclining the seat back 2 toward the seat cushion 1.

The configuration of the footlink 10 is described in more detail. The footlink 10 of the present embodiment is a member configured to support the seat cushion 1. In the present embodiment, the footlink 10 includes a steel plate in a substantially U-shape, and ensures rigidity in such a manner that both ends of the steel plate are bent to form flange portions 10a. Moreover, the footlink 10 is attached to a bottom portion of the seat cushion 1 in a rotatable state.

More specifically speaking, the upper end portion of the footlink 10 includes a footlink rotary shaft 10c about which the footlink 10 rotates. Moreover, the lower end portion of the footlink 10 includes the striker lock mechanism 10b configured to lock an engagement hook 10d such that the engagement hook 10d detachably engages with the striker T2 of the vehicle floor. Further, as illustrated in FIG. 6, the fixing bracket 1b configured to fix the footlink rotary shaft 10c is attached to the bottom portion of the seat cushion 1. The fixing bracket 1b is welded to the seat cushion frame 1a forming the framework of the seat cushion 1. The fixing bracket 1b is welded to a front center portion of the seat cushion frame 1a in the width direction. The upper end portion of the footlink 10 is supported by the footlink rotary shaft 10c fixed to the fixing bracket 1b. That is, in the present embodiment, the footlink 10 is attached to a front center portion of the bottom portion of the seat cushion 1 in the width direction.

Figure 8:
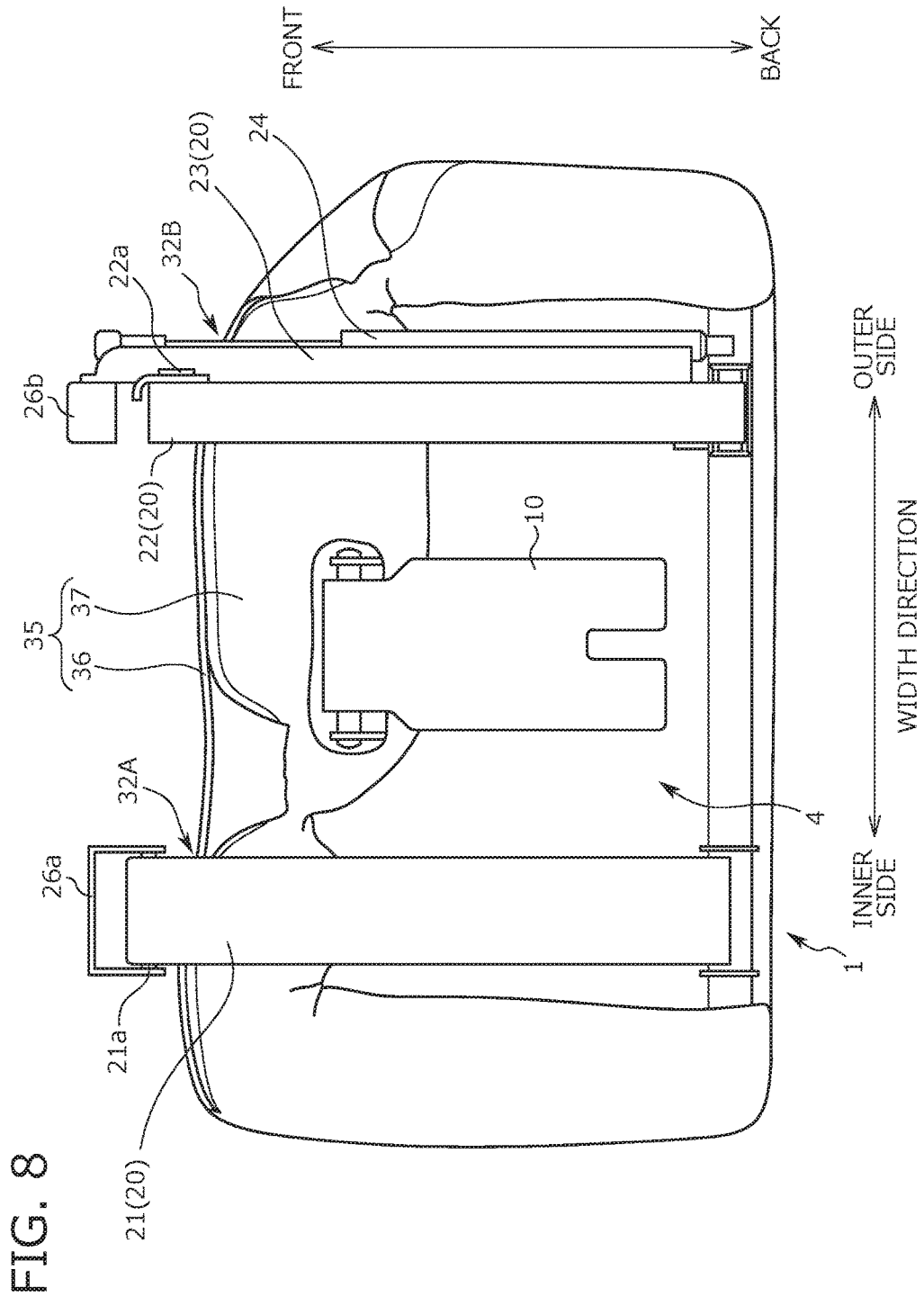
FIG. 8 is a bottom view of a seat cushion of the vehicle seat in a folded state.

Upon switching of the state of the present seat S, the footlink 10 rotates toward or apart from the seat cushion 1. Specifically speaking, when the present seat S is in the seatable state, the footlink 10 is at the farthest position (a standing position illustrated in FIG. 1B) from the seat cushion 1. On the other hand, when the present seat S is in the folded state, the footlink 10 is at the closest position (hereinafter referred to as a "contact position") to the seat cushion 1. Moreover, when the present seat S is in the folded state, the footlink 10 contacts the bottom portion of the seat cushion 1 with the footlink 10 stacking with the seat cushion 1 as illustrated in FIG. 8. FIG. 8 is a bottom view of the seat cushion 1 of the present seat S in the folded state. Additionally speaking, FIG. 8 is simplified in some degree for the sake of easy understanding of illustration. Specifically, components (specifically, the footlink 10, the rotary links 20, a skin material 35, etc.) relating to the features of the present seat S are mainly illustrated.

Note that a coil spring (not shown) is disposed on the footlink rotary shaft 10c. An end portion of the coil spring is connected to the footlink 10, and the coil spring biases the footlink 10 toward the standing position (the position at which the footlink 10 can engage with the striker T2 on the vehicle floor side). Moreover, one end portion of a relay member 25 illustrated in FIG. 6 is attached to the footlink 10. The other end portion of the relay member 25 is attached to the rotary link 20 (more specifically, an inner link 21 or an outer link 22).

In the rotation operation of inclining the rotary links 20 backward, the relay member 25 moves accordingly, and as a result, the footlink 10 rotates toward the contact position against biasing force of the above-described coil spring. That is, after unlocking of the striker lock mechanism 10b from each other, the footlink 10 rotates, in association with rotation of the rotary links 20, toward the seat back side about the footlink rotary shaft 10c, and then, is folded toward the seat cushion 1.

The rotary links 20 are members configured to move the seat cushion 1 to the housed position. Each rotary link 20 is made of steel in an elongated shape as illustrated in FIG. 5, and is disposed at a lower position of the seat cushion 1. More specifically speaking, one end portion (the upper end portion) of each rotary link 20 in a longitudinal direction thereof is coupled to the seat cushion frame 1a. The other end portion (a lower end portion) of each rotary link 20 in the longitudinal direction thereof is rotatably supported on a portion of the vehicle floor T, the portion being recessed by a single step.

The rotary links 20 are coupled to the footlink 10 via the seat cushion 1. Thus, since the footlink 10 and the striker T2 on the vehicle floor side are locked to each other in the seatable state, the rotary links 20 are held at such positions that the rotary links 20 support the seat cushion 1 from below against link biasing springs.

On the other hand, when the footlink 10 and the striker T2 are disengaged from each other, the rotary links 20 rotate to approach the bottom portion of the seat cushion 1 (in other words, the rotary links 20 incline backward). That is, after unlocking of the footlink 10 and the striker T2 from each other, the rotary links 20 rotate about predetermined shafts (specifically, below-described coupling shafts 21a, 22a, 23a) such that the seat cushion 1 moves to the housed position by biasing force of the link biasing springs. As a result, the rotary links 20 moves toward the inside of the housing space T1 together with the seat body S1 including the seat cushion 1.

As described above, upon switching of the state of the present seat S, the rotary links 20 rotate on the vehicle floor T to move toward or apart from the seat cushion 1. Specifically speaking, when the present seat S is in the seatable state, the rotary links 20 are at the farthest positions (the positions illustrated in FIG. 1B) from the seat cushion 1. On the other hand, when the present seat S is in the folded state, the rotary links 20 are at the closest positions to the seat cushion 1. Note that when the present seat S is in the folded state, the rotary links 20 contact, as illustrated in FIG. 8, the bottom portion of the seat cushion 1 with the rotary links 20 piling on the seat cushion 1.

The configuration of each rotary link 20 is described in more detail. The present seat S includes the plurality of rotary links 20. More specifically speaking, the seat housing mechanism 4 of the present embodiment includes, as three rotary links 20, the inner link 21, the outer link 22, and a guide link 23. The inner link 21 described herein corresponds to a first link, the outer link 22 described herein corresponds to a second link, and the guide link 23 described herein corresponds to a third link. Further, the seat housing mechanism 4 of the present embodiment includes the piston damper 24 as a biasing member as illustrated in FIGS. 6 and 7.

Note that the outer link 22 corresponds to "one link" of the present disclosure, and the guide link 23 corresponds to the "other link" of the present disclosure.

The inner link 21 is configured to support the seat body S1 when the present seat S is in the seatable state and to rotatably incline backward to guide the seat body S1 into the housing space T1 when the present seat S is folded. In the present embodiment, the inner link 21 is made of steel in a substantially square tubular shape. More specifically speaking, the inner link 21 is formed in such a tubular shape that two steel plates bent in a substantially U-shape are combined together.

The outer link 22 is configured to cooperate, when the present seat S is folded, with the inner link 21 to guide the seat body S1 into the housing space T1. In the present embodiment, the outer link 22 includes a cylindrical metal pipe and an extending bracket 22i welded to a lower end portion of the metal pipe. The outer link 22 is formed in a substantially L-shape, and is disposed such that an elongated portion thereof is along the inner link 21.

Note that the relay member 25 directly coupled to the footlink 10 is, as illustrated in FIGS. 5 and 6, attached to a lower portion of the outer link 22 with respect to a rotary shaft 22b provided at an upper end of the outer link 22. When the seatable state transitions to the housed state by the relay member 25 as indicated by arrows in FIG. 6, the footlink 10 is folded toward the seat cushion 1 according to the amount of movement of the outer link 22 toward the seat cushion 1.

The guide link 23 is configured to guide the seat cushion 1 such that the seat cushion 1 moves toward the housing space T1 along a predetermined track when the present seat S is folded. In the present embodiment, the guide link 23 includes a steel plate in an L-angle shape, and is disposed along the inner link 21 and the outer link 22.

Note that in the present embodiment, the inner link 21 has a hollow rectangular cross section, the outer link 22 has a hollow circular cross section, and the guide link 23 has a substantially L-shaped cross section. The cross section of each rotary link 20 as described herein means a cross section of a main body (a portion different from the end portion supported by the rotary shaft) of each rotary link 20. The second moment of area of the inner link 21 (e.g., the area of the cross section) is greater than that of each of the outer link 22 and the guide link 23.

The arrangement position of each rotary link 20 is described. As illustrated in FIGS. 5 and 7, the inner link 21 is positioned on the inner side (one end side) in the width direction. Moreover, as illustrated in these figures, the outer link 22 and the guide link 23 are positioned on the outer side (the other end side) in the width direction, and are arranged adjacent to each other in the present embodiment.

Further, the inner link 21 and the outer link 22 are arranged facing each other in the front-to-back direction, and the guide link 23 is disposed slightly behind the inner link 21 and the outer link 22.

In addition, any of the inner link 21, the outer link 22, and the guide link 23 is disposed below the seat cushion 1. More strictly speaking, one end portion of each of the above-described three rotary links 20 in the longitudinal direction thereof is coupled to a back end portion of the seat cushion frame 1a. Moreover, the other end portion of each rotary link 20 in the longitudinal direction thereof is rotatably supported on the vehicle floor T.

Specifically speaking, an attachment bracket T3 is attached to a portion of the vehicle floor T forming a front wall surface of the housing space T1. As illustrated in FIGS. 5 to 7, two shaft fixtures 26a, 26b are welded onto the attachment bracket T3. Of these fixtures, one shaft fixture 26a is fixed to the inner link coupling shaft 21a. An end portion of the inner link 21 is rotatably supported on the inner link coupling shaft 21a. Moreover, the other shaft fixture 26b is fixed to the outer link coupling shaft 22a and the guide link coupling shaft 23a. An end portion of the outer link 22 is rotatably supported on the outer link coupling shaft 22a, and an end portion of the guide link 23 is rotatably supported on the guide link coupling shaft 23a. Note that the outer link coupling shaft 22a corresponds to a first coupling shaft, and the guide link coupling shaft 23a corresponds to a second coupling shaft.

Note that the link biasing springs (not shown) are attached respectively to the outer link coupling shaft 22a and the guide link coupling shaft 23a, and the rotary links 20 are constantly biased toward the housed position about the coupling shafts 22a, 23a by the link biasing springs.

As described above, the inner link 21, the outer link 22, and the guide link 23 each rotate to incline forward or backward about a corresponding one of the coupling shafts 21a, 22a, 23a. Note that a position relationship between the inner link coupling shaft 21a and the outer link coupling shaft 22a is configured such that the shaft centers of the coupling shafts 21a, 22a are coincident with each other in the front-to-back direction and the upper-to-lower direction. On the other hand, a position relationship between the outer link coupling shaft 22a and the guide link coupling shaft 23a is, as illustrated in FIG. 6, configured such that the shaft center of the outer link coupling shaft 22a is positioned forward and above the shaft center of the guide link coupling shaft 23a. In other words, when the present seat S is in the folded state, the outer link coupling shaft 22a is positioned closer to the bottom portion of the seat cushion 1 than the guide link coupling shaft 23a.

Further, the inner link 21, the outer link 22, and the guide link 23 are each coupled to the seat cushion frame 1a with these links being rotatable relative to the seat cushion 1. More specifically speaking, the fixing brackets 1c, 1d for fixing the rotary shafts 21b, 22b, 23b are attached to two points of the back end portion of the seat cushion frame 1a as illustrated in FIGS. 5 to 7. The rotary shaft 21b is fixed to the fixing bracket 1c positioned on the inner side in the width direction, and an end portion (an upper end portion) of the inner link 21 is rotatably supported on the rotary shaft 21b.

In addition, the rotary shafts 22b, 23b are fixed to the fixing bracket 1d positioned on the outer side in the width direction. An end portion (an upper end portion) of the outer link 22 is rotatably supported on one rotary shaft 22b, and an end portion (an upper end portion) of the guide link 23 is rotatably supported on the other rotary shaft 23b. Note that the rotary shaft 22b corresponds to a first rotary shaft, and the rotary shaft 23b corresponds to a second rotary shaft.

Note that in the seatable state, the end portion (the upper end portion) of the guide link 23 is rotatably coupled to the fixing bracket 1d by the rotary shaft 23b behind the end portion (the upper end portion) of the outer link 22 in the front-to-back direction.

The inner link 21 and the outer link coupling shaft 22a of the outer link 22 are arranged forward and above the guide link coupling shaft 23a of the guide link 23, the inner link 21 and the outer link 22 supporting the seat cushion 1. Thus, support rigidity of the seat cushion 1 is enhanced.

As described above, one end portion of each of the inner link 21, the outer link 22, and the guide link 23 is supported by a corresponding one of the rotary shafts 21b, 22b, 23b, and therefore, each of the inner link 21, the outer link 22, and the guide link 23 can rotate relative to the seat cushion 1. In other words, the seat cushion 1 is rotatable relative to the inner link 21, the outer link 22, and the guide link 23.

Further, the seat housing mechanism 4 of the present embodiment includes, as described above, the piston damper 24 as the biasing member. As illustrated in FIGS. 5 to 7, the piston damper 24 includes an elongated body, and is arranged on the outer side of the guide link 23 in the width direction. Moreover, one end portion (an upper end portion) of the piston damper 24 in a longitudinal direction thereof is fixed to a side wall of the seat cushion frame 1a. On the other hand, the other end portion (a lower end portion) of the piston damper 24 in the longitudinal direction thereof is rotatably coupled to the vehicle floor side. Moreover, the piston damper 24 is, together with the guide link 23, coupled to the vehicle floor via the attachment bracket T3.

The piston damper 24 provides biasing force in a direction (an extension direction) along the longitudinal direction of the piston damper 24. In the present embodiment, when the present seat S is in the seatable state, the piston damper 24 upwardly biases the seat cushion 1 of the seat body S1. With this configuration, even when the passenger is seated on the present seat S to apply a downward load onto the seat cushion 1, the seat cushion 1 can be favorably held at a predetermined position.

One end portion (the upper end portion) of the piston damper 24 in the longitudinal direction thereof is rotatably attached to a damper rotary shaft 24b attached to a side surface of the reinforcement side frame 101a. Moreover, the other end portion (the lower end portion) of the piston damper 24 in the longitudinal direction thereof is coupled to a damper coupling shaft 24a attached to the vehicle floor side. A biasing spring (not shown) is attached to the damper coupling shaft 24a. As in the rotary links 20, the piston damper 24 is constantly biased toward the housed position about the damper coupling shaft 24a by the biasing spring.

In the seatable state, the piston damper 24 is disposed at the front of the rotary link 20, is supportable at a position closer to a center portion of the seat cushion 1 in the front-to-back direction, and is held at a position at which the seat cushion 1 is supported against the biasing spring.

On the other hand, when the present seat S is folded, the piston damper 24 rotates in the same direction as that of the above-described three rotary links 20. That is, the piston damper 24 corresponds to a rotary member, and is rotatable relative to the vehicle floor T. In folding of the present seat S, the piston damper 24 rotates backward together with the rotary links 20 while biasing the seat cushion 1. More strictly speaking, after unlocking of the footlink 10 and the striker T2 from each other, the piston damper 24 rotates backward to the housed position about the damper coupling shaft 24a by biasing force of the biasing spring.

Figure 9:
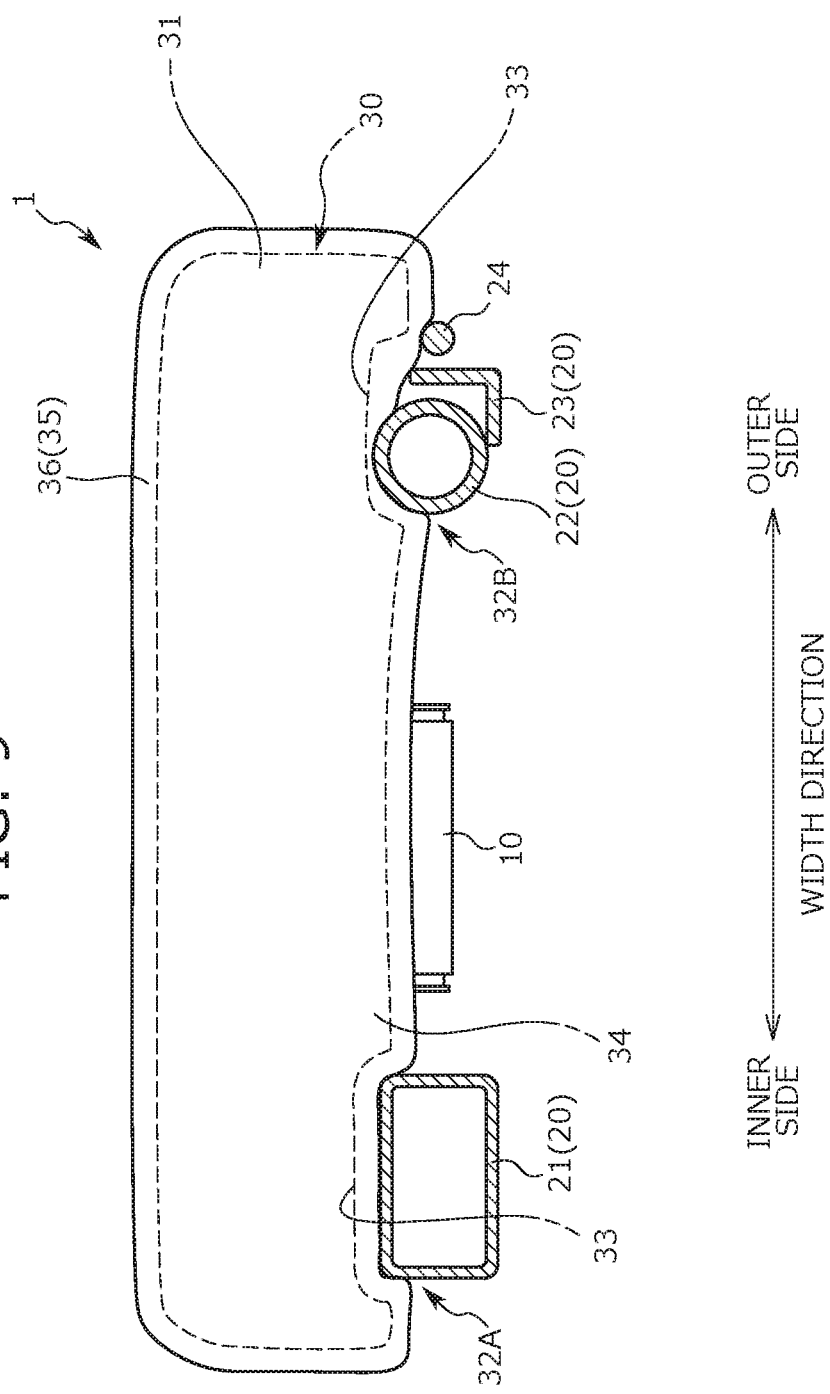
FIG. 9 is a front view of the seat cushion of the vehicle seat in the folded state.
Figure 10:
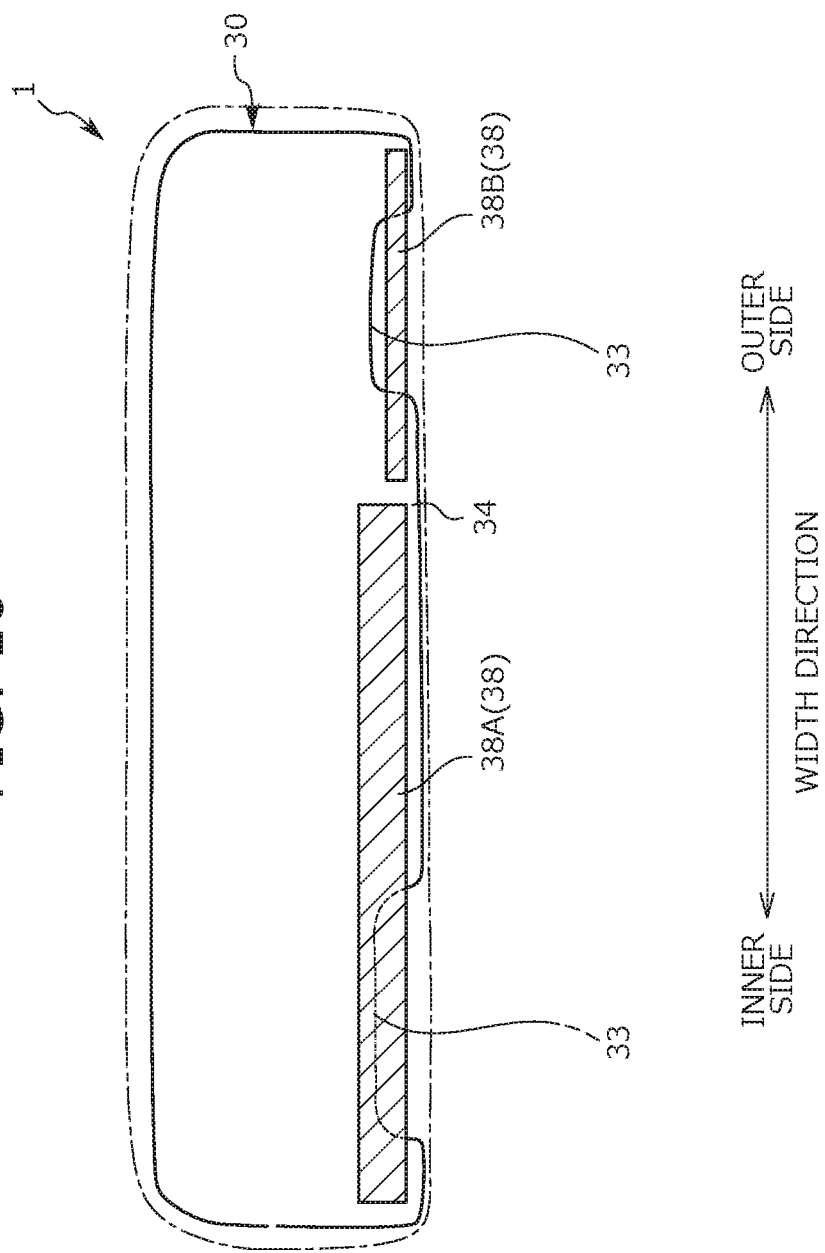
FIG. 10 is a front view of a cushion pad and flexible plates of the seat cushion.
Figure 11:
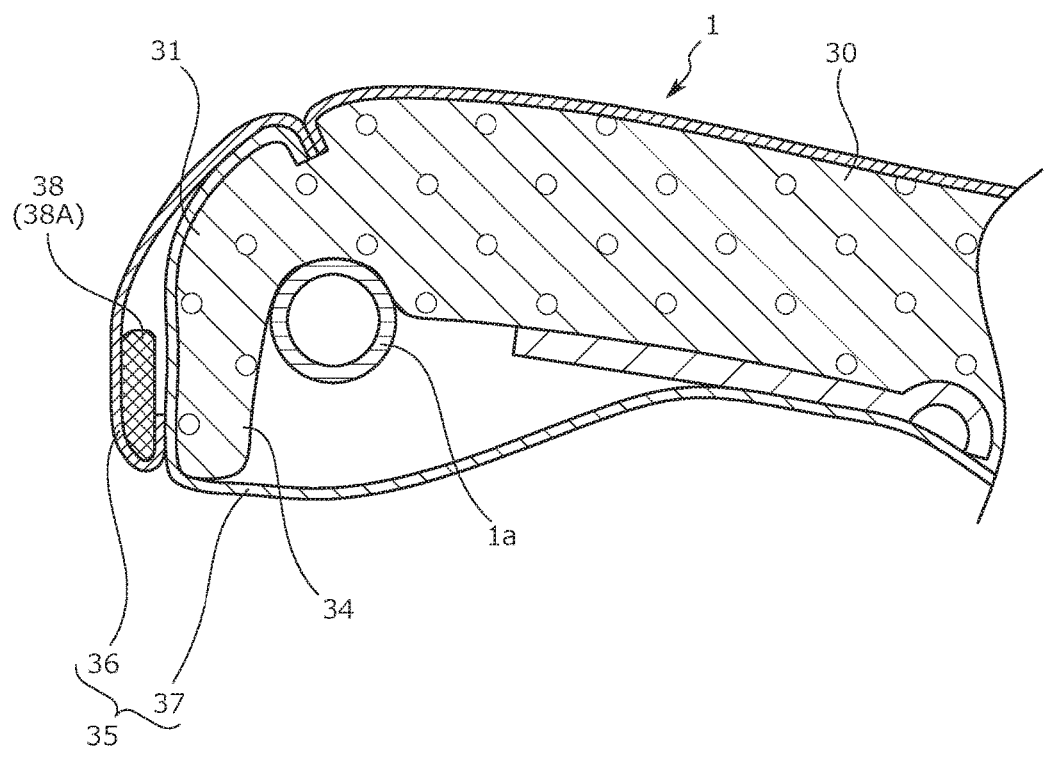
FIG. 11 is a schematic cross-sectional view of a periphery of a holding portion of the seat cushion.
Figure 12:
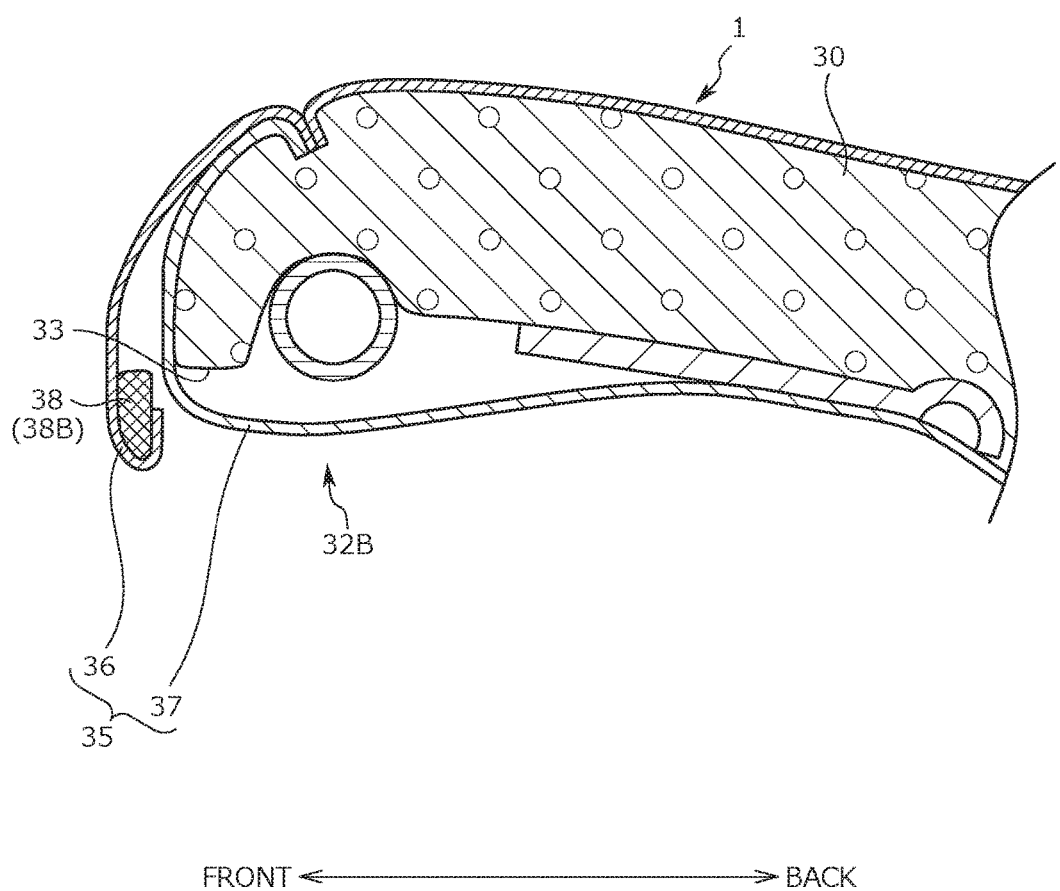
FIG. 12 is a schematic cross-sectional view of a periphery of a recessed portion of the seat cushion.
Figure 13:
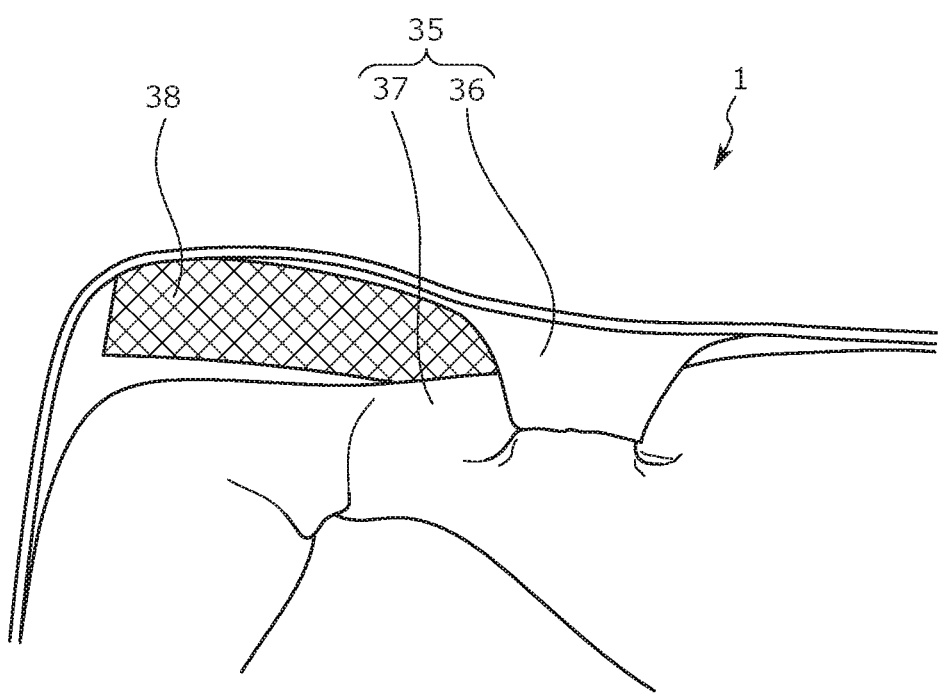
FIG. 13 is a view of the flexible plate attached to a skin material.

Next, the configuration of the seat cushion 1 is described with reference to FIG. 8 having been already described and FIGS. 9 to 13. FIG. 9 is a front view of the seat cushion 1 when the present seat S is in the folded state, and in FIG. 9, a cushion pad 30 in the seat cushion 1 is indicated by a dashed line. FIG. 10 is a view for describing the cushion pad 30 and below-described flexible plates 38, and illustrates the shapes and arrangement positions of both components. Note that FIG. 10 is a front view of the seat cushion 1, and in FIG. 10, the outline of the seat cushion 1 is indicated by a dash-dot line. FIG. 11 is a schematic cross-sectional view of the periphery of a below-described holding portion 34. FIG. 12 is a schematic cross-sectional view of the periphery of below-described recessed portions 33. FIG. 13 is a view of the flexible plate 38 attached to the skin material 35, and illustrates a situation where an outer skin material 36 is turned inside out.

The seat cushion 1 is configured such that the cushion pad 30 placed on the seat cushion frame 1a is covered with the skin material 35. The cushion pad 30 corresponds to a cushion material, and extends to an edge portion of the seat cushion 1. The edge portion of the seat cushion 1 as described herein means an edge portion of the seat cushion 1 as viewed in the plane (e.g., as viewed from above). Specifically, the edge portion of the seat cushion 1 corresponds to a front end portion, a back end portion, one end portion (an inner end portion) in the width direction, and the other end portion (an outer end portion) in the width direction.

As illustrated in FIGS. 11 and 12, a portion (hereinafter referred to as a "suspending portion 31") of the cushion pad 30 extends, at the front end portion of the seat cushion 1, around toward the front side with respect to a front end of the seat cushion frame 1a. The suspending portion 31 is a portion of the cushion pad 30 protruding downward on the front side of the seat cushion frame 1a, and defines the shape and cushioning properties of the front end portion of the seat cushion 1.

Moreover, in the present embodiment, the skin material 35 covering the suspending portion 31 is configured such that two types of skin materials are sewn together. Specifically speaking, as illustrated in FIGS. 11 and 12, an area extending from an upper end to a front end of the suspending portion 31 is covered with the outer skin material 36, and a lower end of the suspending portion 31 is covered with an inner skin material 37. The outer skin material 36 is a member determining the outer appearance (including a shape, a texture, and a feature) of the seat cushion 1, and extends downward along a front end surface of the suspending portion 31. That is, the outer skin material 36 forms an outer edge portion of the skin material 35 covering the suspending portion 31, and forms a front end surface (a design surface) of the seat cushion 1. The outer edge portion described herein is a portion of the skin material 35 forming the outer edge (an outer surface) of the seat cushion 1. Specifically, the outer edge portion is a portion of the seat cushion 1 forming the front end surface, a back end surface, one end surface in the width direction, or the other end surface in the width direction.

Note that the material of the outer skin material 36 is not particularly limited. However, a material (e.g., natural leather and artificial leather) suitable as the skin material is preferably used considering that the material of the outer skin material 36 is associated with the outer appearance (the design) of the seat cushion 1.

The inner skin material 37 is used for holding the outer skin material 36 at a position at which the front end surface of the suspending portion 31 is covered. As illustrated in FIG. 13, the inner skin material 37 is sewn to the outer skin material 36 at the bottom portion of the seat cushion 1. As illustrated in FIG. 8, the inner skin material 37 is disposed on the inner side of the outer skin material 36 at the bottom portion of the seat cushion 1. Note that the material of the inner skin material 37 is not particularly limited. However, a relatively inexpensive material (e.g., non-woven fabric and felt fabric) may be used considering a small influence on the outer appearance of the seat cushion 1.

When the present seat S is in the folded state, a portion of the front end portion of the seat cushion 1 contacts each rotary link 20 as illustrated in FIGS. 8 and 9. Moreover, in the present embodiment, there are two portions contacting the rotary links 20 at the front end portion of the seat cushion 1. One contact portion 32A contacts the rotary link 20 positioned on the inner side in the width direction, i.e., the inner link 21. The other contact portion 32B contacts the rotary links 20 positioned on the outer side in the width direction, i.e., the outer link 22 and the guide link 23. Moreover, the other contact portion 32B also contacts the piston damper 24 in addition to the rotary links 20.

The present seat S has characteristics in the above-described structures of the contact portions 32A, 32B. Specifically speaking, the amount of downward protrusion of the suspending portion 31 is smaller at each contact portion 32A, 32B as illustrated in FIG. 9. In other words, a lower end portion of the suspending portion 31 positioned at each contact portion 32A, 32B is cut out in a rectangular shape, thereby forming the recessed portion 33. As illustrated in FIGS. 9 and 10, the amount of downward protrusion of the suspending portion 31 is smaller in the recessed portion 33 than in portions positioned outside the contact portions 32A, 32B.

As described above, in the present seat S, the portion of the suspending portion 31 positioned at each contact portion 32A, 32B forms the recessed portion 33. With this configuration, the present seat S can be smoothly folded. More specifically speaking, when the rotary links 20 etc. contact each contact portion 32A, 32B in folding of the present seat S, each contact portion 32A, 32B is compressed by the rotary links 20 etc. as illustrated in FIG. 9. Thus, for smoothly folding the present seat S, a suitable compression allowance needs to be ensured at each contact portion 32A, 32B. For this reason, in the present seat S, the above-described recessed portion 33 is provided in each contact portion 32A, 32B, and in this manner, the compression allowance is ensured.

That is, the recessed portions 33 are provided such that the skin material 35 (specifically, the outer skin material 36 and the inner skin material 37) is mainly compressed when the rotary links 20 etc. contact the contact portions 32A, 32B. With this configuration, force (reactive force) acting on the rotary links 20 etc. upon contact with the contact portions 32A, 32B is sufficiently reduced. Thus, the rotary links 20 etc. smoothly stack on the bottom portion of the seat cushion 1, and as a result, the present seat S is smoothly folded.

On the other hand, when the folded present seat S returns to the seatable state, the rotary links 20 etc. contacting the contact portions 32A, 32B are separated from the contact portions 32A, 32B. At this point, the compressed contact portions 32A, 32B are returned to their respective original shapes (e.g., a state before contact with the rotary links 20), to improve the appearance of the seat. In the present seat S, the flexible plate 38 is provided at a portion of the outer skin material 36 positioned at each contact portion 32A, 32B, the outer skin material 36 forming the front end surface of the seat cushion 1. The flexible plate 38 is an example of a shape restoration member. Specifically, the flexible plate 38 includes a rectangular rubber plate having flexibility. Moreover, as illustrated in FIGS. 11 to 13, each flexible plate 38 is bonded to a lower end portion of a back surface of the outer skin material 36.

As described above, in the present seat S, the flexible plate 38 is bonded to the portion of the outer skin material 36 positioned at each contact portion 32A, 32B. Thus, when the rotary links 20 etc. are separated from the contact portions 32A, 32B to return the present seat S to the seatable state, the shape of each contact portion 32A, 32B (specifically, the compressed outer skin material 36) is favorably restored from a compressed state to an original state by resilience of the flexible plate 38.

As illustrated in FIG. 9, the suspending portion 31 of the cushion pad 30 includes the recessed portion 33 positioned at the contact portion 32A on the inner side in the width direction, the recessed portion 33 positioned at the contact portion 32B on the outer side in the width direction, and the holding portion 34 positioned between both recessed portions 33. The holding portion 34 is a portion of the suspending portion 31 in which the amount of downward protrusion is greater than in the recessed portions 33. Moreover, the holding portion 34 is disposed at a center portion of the front end portion of the seat cushion 1 in the width direction (in other words, a portion positioned at the front of the footlink 10).

The center portion of the front end portion of the seat cushion 1 in the width direction has the holding portion 34 as described above, and therefore, the shape of the outer skin material 36 covering such a portion is favorably held in place. That is, at the center portion of the front end portion of the seat cushion 1 in the width direction, the amount of downward protrusion of the suspending portion 31 is greater as illustrated in FIG. 11. Thus, the outer skin material 36 positioned at the center portion of the front end portion of the seat cushion 1 in the width direction is maintained in a favorably-stretched state by the cushion pad 30 (at the holding portion 34) disposed behind the outer skin material 36.

Moreover, in the present embodiment, the recessed portions 33 are provided to sandwich the footlink 10 in the width direction as illustrated in FIGS. 8 and 9. Further, the above-described holding portion 34 is provided between the recessed portions 33 in the width direction. With this configuration, the shape of the outer skin material 36 at the center portion of the front end portion of the seat cushion 1 in the width direction can be, in the present embodiment, favorably held as compared to a configuration in which the recessed portions 33 are continuously provided (i.e., a configuration in which the continuous recessed portion 33 is formed from one contact portion 32A to the other contact portion 32B).

Further, in the present embodiment, the flexible plates 38 are provided separately for the two contact portions 32A, 32B as illustrated in FIG. 10. That is, one flexible plate 38 (hereinafter referred to as a "first plate 38A") is provided for the contact portion 32A on the inner side in the width direction, and another flexible plate 38 (hereinafter referred to as a "second plate 38B") is provided for the contact portion 32B on the outer side in the width direction. These two flexible plates 38 each extend along the width direction.

Moreover, each flexible plate 38 extends, in the width direction, over the recessed portion 33 positioned at a corresponding one of the contact portions 32A, 32B. In other words, between both ends of the flexible plate 38 in the width direction, the recessed portion 33 of a corresponding one of the contact portions 32A, 32B is provided. Since the flexible plate 38 is disposed to extend over the recessed portion 33 as described above, the shape of the outer skin material 36 can be, in the present embodiment, more effectively restored when the rotary links 20 etc. are separated from the contact portions 32A, 32B.

Note that the first plate 38A of the present embodiment extends to a position reaching the holding portion 34 beyond the contact portion 32A on the inner side in the width direction, as illustrated in FIG. 10.

Moreover, in the present embodiment, the contact portion 32A on the inner side in the width direction contacts the single rotary link 20 (i.e., the inner link 21), whereas the contact portion 32B on the outer side in the width direction contacts the two rotary links 20 (i.e., the outer link 22 and the guide link 23). The two rotary links 20 contacting the contact portion 32B are arranged adjacent to each other in the width direction. Further, the rotary shafts (the outer link coupling shaft 22a, the guide link coupling shaft 23a) of the two rotary links 20 are at positions shifted from each other in the front-to-back direction. The amount of compression upon contact with the corresponding link is greater in the contact portion 32B on the outer side in the width direction than in the contact portion 32A, which contacts the single rotary link 20, on the inner side in the width direction, the contact portion 32B contacting the two rotary links 20 whose rotary shafts are shifted from each other in the front-to-back direction as described above.

Further, the width of the flexible plate 38 (i.e., the second plate 38B) provided at the contact portion 32B on the outer side in the width direction is smaller than the width of the flexible plate 38 (i.e., the first plate 38A) provided at the contact portion 32A on the inner side in the width direction. The width described herein means a length in the upper-to-lower direction.

Of the two contact portions 32A, 32B, the contact portion 32B on the outer side in the width direction is, in the present embodiment, provided with the narrower flexible plate 38 as described above, the amount of compression upon contact with the link being greater in the contact portion 32B. By narrowing of the flexible plate 38, the outer skin material 36 provided at the contact portion 32B on the outer side in the width direction is more easily deformable. As described above, the width of the flexible plate 38 for the contact portion 32B with a greater compression amount is narrowed so that the contact portion 32B can be easily compressed, and therefore, the present seat S can be more smoothly folded.

Moreover, in the present embodiment, the skin material 35 covering the suspending portion 31 of the cushion pad 30 at the front end portion of the seat cushion 1 is, as described above, configured such that the outer skin material 36 and the inner skin material 37 are sewn together. Specifically speaking, the skin material 35 has a double structure at the front end portion of the seat cushion 1 as illustrated in FIGS. 11 and 12. More specifically speaking, the outer skin material 36 forming a seat outer edge and the inner skin material 37 positioned on the inner side of the outer skin material 36 are sewn together at the bottom portion of the seat cushion 1 as illustrated in FIG. 13.

Further, when the present seat S is in the folded state, the rotary links 20 contact the contact portions 32A, 32B at the bottom portion of the seat cushion 1, and in this state, contact both of the outer skin material 36 and the inner skin material 37 as illustrated in FIG. 8. In the present embodiment, the area of contact between the rotary link 20 and the inner skin material 37 is larger than the area of contact between the rotary link 20 and the outer skin material 36. Of the outer skin material 36 and the inner skin material 37, the inner skin material 37 contacts, as described above, more of each rotary link 20 when the present seat S is in the folded state. Thus, the influence of contact with the rotary link 20 on the outer appearance of the seat cushion 1, specifically occurrence of wrinkles of the outer skin material 36, can be reduced, and the design of the seat cushion 1 can be improved.

Change in Biasing Force of Piston Damper According to Rotation Position of Rotary Links Next, a change in the biasing force of the piston damper 24 on the seat cushion 1 according to a position relationship among the outer link 22, the guide link 23, and the piston damper 24 is described with reference to FIGS. 14 to 17.

Figure 14:
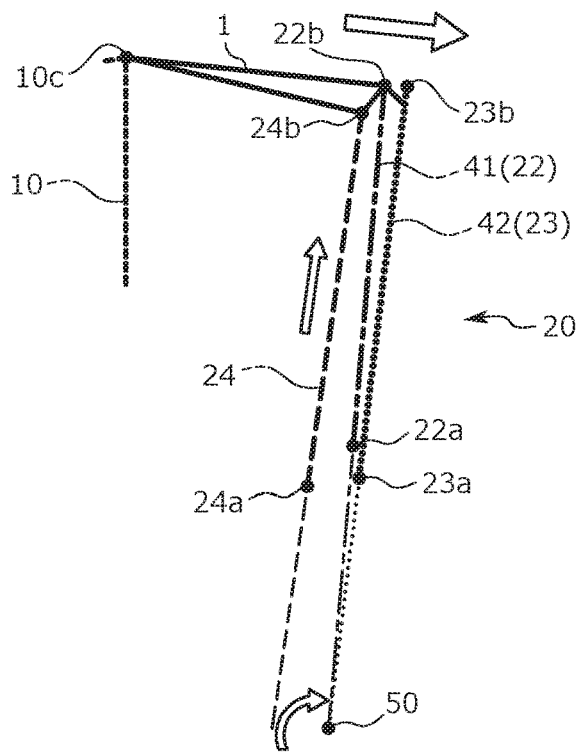
FIG. 14 is a schematic view of a rotary link state of a seat frame and a biasing force direction of a piston damper in a seatable state.
Figure 15:
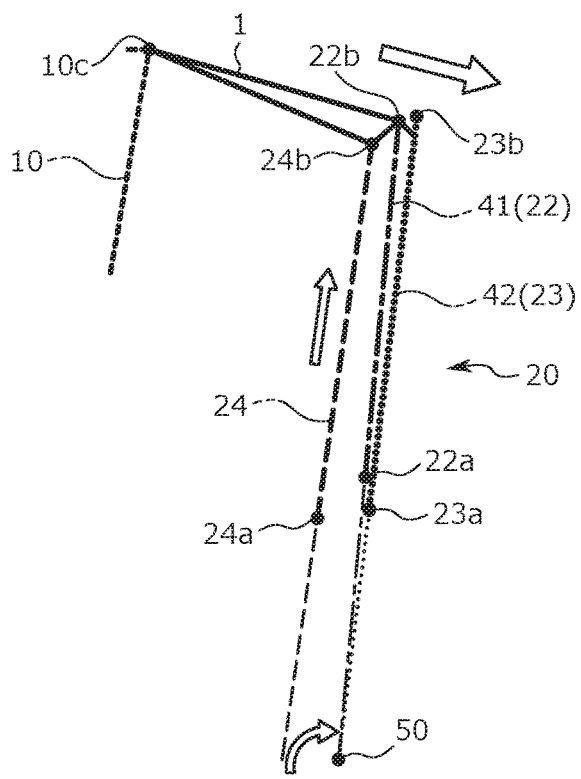
FIG. 15 is a schematic view of the rotary link state of the seat frame and the biasing force direction of the piston damper in a pop-up state.
Figure 16:
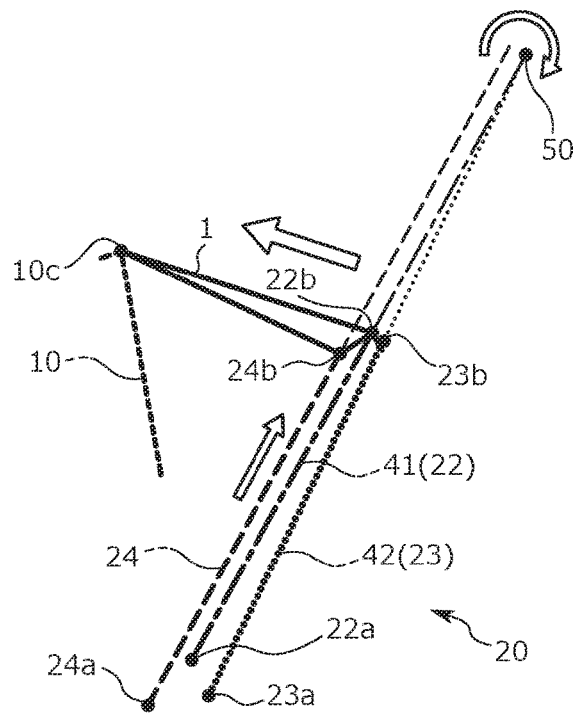
FIG. 16 is a schematic view of the rotary link state of the seat frame and the biasing force direction of the piston damper in an intermediate rotation state.
Figure 17:
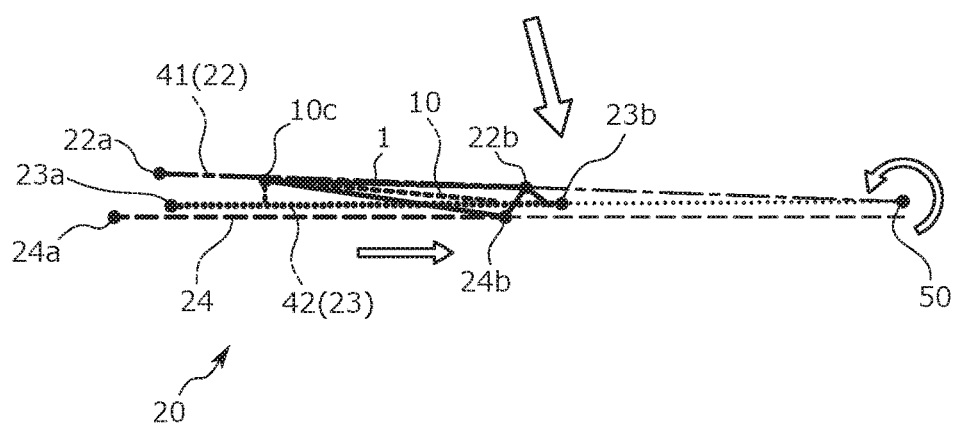
FIG. 17 is a schematic view of the rotary link state of the seat frame and the biasing force direction of the piston damper in a housed state.

FIGS. 14 to 17 are schematic views of the state of each rotary link 20 of the seat frame and the direction of the biasing force of the piston damper 24. FIG. 14 illustrates the seatable state, FIG. 15 illustrates a pop-up state, FIG. 16 illustrates an intermediate rotation state, and FIG. 17 illustrates the housed state.

A plane passing through the center line of the outer link coupling shaft 22a and the center line of the rotary shaft 22b in the outer link 22 is a virtual plane 41, and a plane passing through the center line of the guide link coupling shaft 23a and the center line of the rotary shaft 23b in the guide link 23 is a virtual plane 42. Note that the virtual plane 41 corresponds to a first plane of the present disclosure, and the virtual plane 42 corresponds to a second plane of the present disclosure. The intersection line 50 between the virtual plane 41 and the virtual plane 42 is an instant center for a link mechanism.

In the seatable state illustrated in FIG. 14, the intersection line 50 is below the seat cushion 1. Moreover, the piston damper 24 extends at the front of the intersection line 50, and upwardly biases the seat cushion 1. Thus, a clockwise moment is generated about the intersection line 50 as indicated by an arc-shaped arrow in FIG. 14, and applies biasing force toward the seat back side to the seat cushion 1 positioned above the intersection line 50. That is, when the striker lock mechanism 10b is unlocked, the seat cushion 1 moves upward by the biasing force of the piston damper 24 in the extension direction thereof, and moves backward by the clockwise moment about the intersection line 50.

In the pop-up state illustrated in FIG. 15, the seat cushion 1 moves upward by the biasing force of the piston damper 24 in the extension direction thereof. Note that in this state, the intersection line 50 is, as in the seatable state, below the seat cushion 1, and the piston damper 24 extends at the front of the intersection line 50 and upwardly biases the seat cushion 1.

In the intermediate rotation state illustrated in FIG. 16, the force of upwardly biasing the seat cushion 1 as a force component of the biasing force in the extension direction gradually decreases while the piston damper 24 rotatably inclines. Thus, as the rotary links 20 rotate in a housing direction, the seat cushion 1 approaches the rotary links 20 by its own weight, and the rotary shaft 22b disposed at the front of the rotary shaft 23b in the seat cushion 1 approaches the guide link 23. A distance between the rotary shaft 22b and the virtual plane 42 becomes shorter than a distance between the outer link coupling shaft 22a and the virtual plane 42, and therefore, the intersection line 50 is positioned above the seat cushion 1. In other words, switching between the state in which the intersection line 50 is positioned on an extension of the rotary shaft 22b or the rotary shaft 23b and the state in which the intersection line 50 is positioned on an extension of the outer link coupling shaft 22a or the guide link coupling shaft 23a is made when the inclination of the virtual plane 41 and the inclination of the virtual plane 42 become parallel to each other.

The piston damper 24 extends at the front of the intersection line 50, and upwardly biases the seat cushion 1. Thus, a clockwise moment is generated about the intersection line 50 as indicated by an arc-shaped arrow in FIG. 16, and applies biasing force toward the seat front side to the seat cushion 1 positioned below the intersection line 50. That is, the seat cushion 1 inclines backward by the weight of the present seat S itself in the intermediate rotation state while the biasing force applied to the seat cushion 1 due to the above-described clockwise moment about the intersection line 50 generates forward drag. With such force, rapid movement can be prevented when the seat cushion 1 is housed, and movement of the seat cushion 1 is supported when the seat cushion 1 is lifted.

In particular, the forward biasing force applied to the seat cushion 1 due to the clockwise moment about the intersection line 50 is set equal to or smaller than a backward force component by the weight of the present seat S itself. With such setting, the seat cushion 1 decelerates and rotates to the housed position without limiting rotation to the housed position.

In the housed state illustrated in FIG. 17, the intersection line 50 is positioned behind the seat cushion 1. The piston damper 24 extends below the intersection line 50, and backwardly biases the seat cushion 1. Thus, a counterclockwise moment is generated about the intersection line 50 as indicated by an arc-shaped arrow in FIG. 17, and applies biasing force toward the seat lower side to the seat cushion 1 positioned at the front of the intersection line 50. That is, the biasing force is, in the housed state, applied to the seat cushion 1 in a direction from the seatable position toward the housed position, and unexpected upward lifting of the seat cushion 1 from the housed state is reduced.

In order to reliably prevent unexpected upward lifting of the seat cushion 1 from the housed state, the present seat S may be fixed to the vehicle floor by a lock device 105 illustrated in FIG. 4. The lock device 105 corresponds to a holding member of the present disclosure. The lock device 105 includes an inverted U-shaped striker 105b attached to the vehicle floor, and a backwardly-protruding engagement hook 105a attached to the back side of the seat cushion 1 to rotate up and down.

According to the configuration in which the present seat S is fixed to the vehicle floor by the lock device 105 as described above, upward lifting of the seat cushion 1 can be reliably prevented even when vertical oscillation is caused in vehicle operation, leading to stable vehicle inner environment. Note that the present seat S may be more easily fixed to a portion of the vehicle floor not by the lock device 105 but by, e.g., engagement of straps (not shown) fixed to the vehicle floor and the vehicle seat as in seat belt engagement.

OTHER EMBODIMENTS

In the above-described embodiment, a specific example of the configuration of the vehicle seat of the present disclosure has been described. Note that the above-described embodiment is for the sake of easy understanding of the present disclosure, and is not intended to limit the embodiments of the invention. That is, changes and modifications can be made to the embodiments of the present disclosure without departing from the gist of the invention, and needless to say, the invention includes equivalents thereof.

In the above-described embodiment, the contact portions 32A, 32B contacting the rotary links 20 are provided at the front end portion of the seat cushion 1. Moreover, in the above-described embodiment, the two contact portions 32A, 32B are provided at different positions in the width direction. Note that the number of contact portions, the position of each contact portion, and a contact target member for each contact portion are not limited to those in the above-described contents. Specifically speaking, the position of each contact portion is not limited to the front end portion of the seat cushion 1, and may be the back end portion or the end portion in the width direction. Moreover, the number of contact portions may be at least one or more contact portions, and three or more contact portions may be provided, for example. Further, as long as the member contacting the edge portion of the seat cushion 1 rotates to approach the seat cushion 1 when the present seat S is folded, such a member may be the footlink 10 or the piston damper 24.

Moreover, in the above-described embodiment, the flexible plates 38 are used as the shape restoration members, but the present disclosure is not limited to such plates. As long as the shape of the outer skin material 36 positioned at the contact portions 32A, 32B can be restored when the contact portions 32A, 32B are separated from the rotary links 20, other members than the flexible plate 38 may be used, and a liner member having flexibility, such as a wire, may be used.

Further, in the above-described embodiment, the skin material 35 covering the suspending portion 31 of the cushion pad 30 at the front end portion of the seat cushion 1 is configured such that the outer skin material 36 and the inner skin material 37 are sewn together. That is, in the above-described embodiment, the skin material 35 forming the front end portion of the seat cushion 1 is divided into the portion forming the outer edge portion and the portion positioned on the inner side of the portion forming the outer edge portion. Note that the present disclosure is not limited to such a configuration. Of the skin material 35 forming the front end portion of the seat cushion 1, the portion forming the outer edge portion and the portion positioned on the inner side of the portion forming the outer edge portion may be formed of a same skin material (a single piece of cloth).

In addition, in the above-described embodiment, the flexible plates 38 are provided separately for the two contact portions 32A, 32B. However, the present disclosure is not limited to such a configuration. A same flexible plate 38 may be provided for the two contact portions 32A, 32B. Moreover, in the above-described embodiment, the width of each flexible plate 38 (specifically, the first plate 38A and the second plate 38B) provided separately for the contact portions 32A, 32B varies according to the formation position of a corresponding one of the contact portions 32A, 32B. Note that the present disclosure is not limited to such a configuration, and the width of the flexible plate 38 may be the same between the contact portions 32A, 32B.

Further, the arrangement and configuration of, e.g., each rotary link 20 or the piston damper 24 have been described above in the embodiment merely as an example, and are not intended to limit the present disclosure. That is, in the above-described embodiment, it has been described that the inner link 21 is disposed on the seat right side and that the outer link 22, the guide link 23, and the piston damper 24 are arranged on the seat left side. However, such arrangement may be reversed. In addition, the position relationship in the width direction among the outer link 22, the guide link 23, and the piston damper 24 is also optional. It has been also described that the outer link 22 and the guide link 23 are rotatably supported on the same fixing bracket 1d, but these links may be rotatably supported on separate components.

Moreover, in the above-described embodiment, the present seat S is configured so that the seat cushion 1 can be housed at the housed position formed on the seat back side, but the present disclosure is not limited to such a configuration. For example, the present seat S may be configured so that the seat cushion 1 can be housed at the housed position formed on the seat front or lateral side. In such a configuration, similar advantageous effects can be provided in such a manner that a relationship, which is similar to that in the configuration of the above-described embodiment, between the position of the intersection line 50 of the virtual planes in the rotary links corresponding to the inner link 21 and the outer link 22 and the direction of the biasing force of the piston damper 24 is applied.

More specifically speaking, the present seat S is configured such that the intersection line 50 of the rotary links is positioned above the seat cushion 1 in the intermediate rotation state between the seatable state and the housed state, for example. Further, the piston damper 24 is disposed such that the biasing force of the piston damper 24 passes on a seatable state side with respect to the intersection line 50 (the back side in the case of forming the housed position on the front side, and the right side in the case of forming the housed position on the left side). With this configuration, the force acting in the direction in which the seat cushion 1 decelerates is generated when the seat cushion 1 is housed, and therefore, the seat cushion 1 can smoothly transition to the housed state without providing a feeling of discomfort to a user. Further, similar advantageous effects can be provided in such a manner that the configuration, which is similar to the configuration of the above-described embodiment, for not unexpectedly rotating the seat cushion 1 in the housed state is employed.

Moreover, in the above-described embodiment, the housable vehicle seat used for an automobile has been described as a specific example. However, the present disclosure is not limited to such a vehicle seat. The vehicle seat can be utilized not only as vehicle seats for trains, buses, etc. but also as transportation seats for airplanes, ships, etc.

TABLE OF REFERENCE NUMERALS

S: present seat
  S1: seat body
T: vehicle floor
  T1: housing space
  T2: striker
  T3: attachment bracket
1: seat cushion
  1a: seat cushion frame
  1b, 1c, 1d: fixing bracket
2: seat back
  2a: seat back frame
3: head rest
4: seat housing mechanism (seat movement mechanism)
10: footlink
  10a: flange portion
  10b: striker lock mechanism
  10c: footlink rotary shaft
  10d: engagement hook
20: rotary link (rotary member)
21: inner link 21a: inner link coupling shaft
21b: rotary shaft
22: outer link (first rotary link)
  22a: outer link coupling shaft (first coupling shaft)
  22b: rotary shaft (first rotary shaft)
  22i: extending bracket
23: guide link (second rotary link)
  23a: guide link coupling shaft (second coupling shaft)
  23b: rotary shaft (second rotary shaft)
24: piston damper (rotary member, biasing member)
  24a: damper coupling shaft
  24b: damper rotary shaft
25: relay member
26a, 26b: shaft fixture
30: cushion pad (cushion material)
31: suspending portion
32A, 32B: contact portion
33: recessed portion
34: holding portion
35: skin material
36: outer skin material
37: inner skin material
38: flexible plate
  38A: first plate
  38B: second plate
41: virtual plane (first plane)
42: virtual plane (second plane)
50: intersection line
101: side frame
  101a: reinforcement side frame
102: front coupling pipe
103: back coupling pipe
104: pan frame
105: lock device (holding member)
  105a: engagement hook
  105b: striker
106: operation strap

The invention claimed is:

1. A vehicle seat, comprising:
a seat cushion; and
a seat movement mechanism configured to reciprocate the seat cushion between a first position and a second position different from each other in a predetermined direction;
wherein:
  the seat movement mechanism includes
    a first rotary link and a second rotary link configured to rotate relative to a vehicle floor and rotate relative to the seat cushion when the seat cushion moves between the first position and the second position, and
    a biasing member configured to provide, to the seat cushion, biasing force in a direction from one end fixed to the vehicle floor toward the other end attached to the seat cushion;
  a virtual plane passing through a center line of a first rotary shaft configured to rotatably support the first rotary link and a center line of a first coupling shaft provided to couple the first rotary link to the seat cushion is a first plane;
  a virtual plane passing through a center line of a second rotary shaft configured to rotatably support the second rotary link and a center line of a second coupling shaft provided to couple the second rotary link to the seat cushion is a second plane; and
  in a zone in which the seat movement mechanism moves the seat cushion between the first position and the second position, both of the first rotary link and the second rotary link rotating relative to the vehicle floor rotate relative to the seat cushion, and in this manner, an intersection line between the first plane and the second plane is, while both of the first rotary link and the second rotary link incline to be closer to the second position than to the first position in the zone, positioned above the seat cushion and the biasing member biases the seat cushion toward the first position.

2. The vehicle seat of claim 1, wherein when the seat cushion is located at the first position, the intersection line is positioned below the seat cushion and the biasing member biases the seat cushion toward the second position.

3. The vehicle seat of claim 1, wherein a reactive force generated by the biasing member about the intersection line positioned above the seat cushion is smaller than a force component of force generated by a weight of the seat cushion itself, the force component being parallel to the reactive force.

4. The vehicle seat of claim 1, wherein:
  when the seat cushion is located at the second position, the intersection line and the first coupling shaft are positioned on opposite sides of the first rotary shaft, and
  the biasing member biases the seat cushion in a direction from the first position to the second position.

5. The vehicle seat of claim 1, wherein the vehicle seat is provided with a holding member fixed to a vehicle body and configured to hold a state of the seat cushion located at the second position.

6. The vehicle seat of claim 5, wherein the holding member is a strap connecting between the vehicle seat and the vehicle body.

7. The vehicle seat of claim 5, wherein the holding member is a lock device configured to fix the vehicle seat to the vehicle body.

* * * * *